United States Patent [19]
DeMatte et al.

[11] 4,238,824
[45] Dec. 9, 1980

[54] LINE LENGTH NAVIGATION SYSTEM

[75] Inventors: James F. DeMatte, Coram; Nazaro A. Simonelli, Woodbury, both of N.Y.

[73] Assignee: Sperry Corporation, New York, N.Y.

[21] Appl. No.: 971,278

[22] Filed: Dec. 20, 1978

[51] Int. Cl.³ .................... G06F 15/50; B63B 35/00; F16L 1/04
[52] U.S. Cl. .................... 364/449; 364/457; 364/479; 405/154; 405/158; 405/166
[58] Field of Search ............... 364/424, 431, 457, 479, 364/505, 508; 405/154, 158, 166, 172

[56] References Cited
U.S. PATENT DOCUMENTS

| | | | |
|---|---|---|---|
| Re. 28,410 | 5/1975 | Cox et al. | 405/172 |
| 3,576,977 | 5/1971 | Kolb | 364/457 |
| 3,668,878 | 6/1972 | Jones et al. | 364/431 |
| 4,120,167 | 10/1978 | Denman et al. | 405/166 |
| 4,164,379 | 8/1979 | Denman | 405/158 |

OTHER PUBLICATIONS

Suzuki et al., New Cable Ship Kuroshio Maru. Nippon Telegraph & Telephone Co. Japan Telecommunications Review, Oct. 1975, vol. 17 No. 4, p. 302-310
Brown, Aerospace Systems Aid Subsea Laying, The Oil and Gas Journal, Oct. 14, 1974, pp. 71, 72, 74, 79, 80.
Willems et al., Automatic Winch Control Used on Large Barge, The Oil and Gas Journal, Sep. 22, 1975, pp. 100, 101, 102, 107.

*Primary Examiner*—Felix D. Gruber
*Attorney, Agent, or Firm*—Howard P. Terry

[57] ABSTRACT

The invention is a guidance system used in laying undersea pipe or cable from a pipe-laying vessel when radio transmissions are unreliable. The system processes parameters derived from sensors normally aboard a pipe-laying vessel and sensors cooperating with active winches applying tension to the several anchor lines. The vessel's pitch, roll, and heading angles are supplied from gyrocompass and vertical gyroscopic instruments. Anchor line elevation and azimuth angles with respect to deck coordinates are yielded by conventional angle pick offs associated with fairlead devices, as are the line axial tension and the length of anchor line paid out. Initial conditions, including the initial position of the vessel, are easily obtained in the usual manner. From certain of these parameters, the invention derives intermediate anchor line parameters for use in computing fairlead motion.

The intermediate data is used to compute compensated fairlead motion data by first computing apparent fairlead motion from anchor line tension changes. This version of fairlead motion contains undesired terms due to apparent fairlead motion caused by anchor line length changes and also due to actual fairlead motion caused by vessel attitude changes. Therefore, second and third computations are made of the contributions of the latter effects. This is done so that apparent fairlead motion due to anchor line length change and actual fairlead motion due to vessel attitude change may be subtracted from the measure of apparent fairlead motion as calculated from anchor line tension change, yielding the desired compensated fairlead motion value free of significant disturbing components. An estimated value of vessel position change is then obtained by a least squares estimation involving these fairlead motion terms. Correction of vessel position then follows by cooperative operation of the winch and thruster assemblies.

42 Claims, 25 Drawing Figures

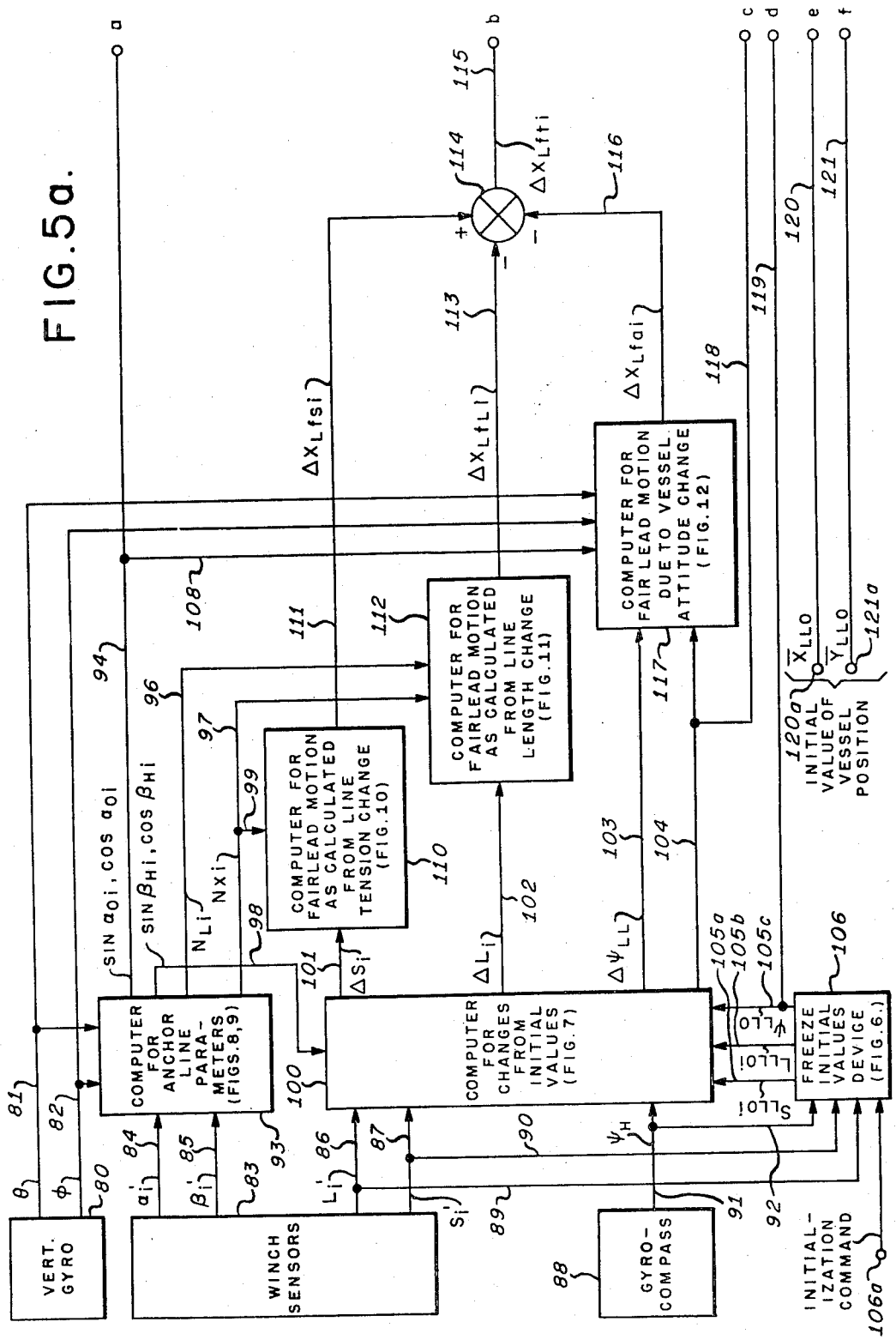

PART OF 93

$$\Delta \psi_{LL} = \psi_H - \psi_{LLO} \tag{1}$$

$$\Delta L_i = L'_i - L_{LLOi} \tag{2}$$

$$\Delta S_i = S'_i - S_{LLOi} \tag{3}$$

$$\beta_{HXi} = \beta_{Hi} + \psi_H - \psi_{LLO} \tag{4}$$

$$\sin \alpha_{Hi} = -\sin\theta \cos\alpha'_i \cos\beta'_i + \cos\theta \sin\phi \cos\alpha'_i \sin\beta'_i \tag{5}$$
$$+ \cos\theta \cos\phi \sin\alpha'_i$$

$$\cos \alpha_{Hi} = (1 - \sin^2 \alpha_{Hi})^{1/2} \tag{6}$$

$$\sin \beta_{Hi} = (\cos \alpha_{Hi})^{-1} (\cos\phi \cos\alpha'_i \sin\beta'_i - \sin\phi \sin\alpha'_i) \tag{7}$$

$$\cos \beta_{Hi} = (\cos \alpha_{Hi})^{-1} (\cos\theta \cos\alpha'_i \cos\beta'_i + \sin\theta \sin\phi \cos\alpha'_i \sin\beta'_i \tag{8}$$
$$+ \sin\theta \cos\phi \sin\alpha'_i)$$

$$\widetilde{\sin\alpha}_{Hi} = (1 - \frac{\Delta T}{\tau}) \sin\alpha_{Hi}\Big|_{\text{LAST VALUE}} + \frac{\Delta T}{\tau} \sin\alpha_{Hi} \tag{9a}$$

$$\widetilde{\cos\alpha}_{Hi} = (1 - (\widetilde{\sin\alpha}_{Hi})^2)^{1/2} \tag{9b}$$

$$C_i = \log_e (1 + \widetilde{\sin\alpha}_{Hi}) / \widetilde{\cos\alpha}_{Hi} \tag{10}$$

$$A_i = (1 - \widetilde{\cos\alpha}_{Hi}) / \widetilde{\sin\alpha}_{Hi} \tag{11}$$

$$\cos \alpha_{Oi} = (1 + (C_i - A_i)^2)^{-1/2} \tag{12}$$

$$\sin \alpha_{Oi} = (C_i - A_i) \cos \alpha_{Oi} \tag{13}$$

$$N_{Li} = -\omega / (C_i - 2A_i) \tag{14}$$

$$N_{Xi} = N_{Li} / \cos \alpha_{Oi} \tag{15}$$

FIG. 16.

$$\Delta x_{Lfai} = \\
(-R_{FYi} \cdot \Delta \psi_{LL} + R_{FZi} \cdot \theta) \cos \beta_{HXi} \cdot \cos a_{0i} \\
+ (R_{FXi} \cdot \Delta \psi_{LL} + R_{FZi} \cdot \theta) \sin \beta_{HXi} \cdot \cos a_{0i} \\
+ (-R_{FXi} \cdot \theta + R_{FYi} \cdot \phi) \sin a_{0i}$$
(16)

$$\Delta x_{Lfti} = \Delta x_{Lfsi} - \Delta x_{Lfli} - \Delta x_{Lfai}$$
(17)

$$\Delta x_b = \frac{1}{DET} \begin{bmatrix} \Sigma \Delta x_{Lfti} \cos \beta_{HXi} \cos a_{0i} \\ \Sigma \Delta x_{Lfti} \sin \beta_{HXi} \cos a_{0i} \\ \Sigma \Delta x_{Lfti} \sin a_{0i} \end{bmatrix} \begin{bmatrix} \Sigma \sin \beta_{HXi} \cos \beta_{HXi} \cos^2 a_{0i} \\ \Sigma \sin^2 \beta_{HXi} \cos^2 a_{0i} \\ \Sigma \sin \beta_{HXi} \sin a_{0i} \cos a_{0i} \end{bmatrix} \begin{bmatrix} \Sigma \cos \beta_{HXi} \cos a_{0i} \sin a_{0i} \\ \Sigma \sin \beta_{HXi} \sin a_{0i} \cos a_{0i} \\ \Sigma \sin^2 a_{0i} \end{bmatrix}$$
(18)

$$\Delta y_b = \frac{1}{DET} \begin{bmatrix} \Sigma \cos^2 \beta_{HXi} \cos^2 a_{0i} \\ \Sigma \cos \beta_{HXi} \sin \beta_{HXi} \cos^2 a_{0i} \\ \Sigma \cos \beta_{HXi} \cos a_{0i} \sin a_{0i} \end{bmatrix} \begin{bmatrix} \Sigma \Delta x_{Lfti} \cos \beta_{HXi} \cos a_{0i} \\ \Sigma \Delta x_{Lfti} \sin \beta_{HXi} \cos a_{0i} \\ \Sigma \Delta x_{Lfti} \sin a_{0i} \end{bmatrix} \begin{bmatrix} \Sigma \cos \beta_{HXi} \cos a_{0i} \sin a_{0i} \\ \Sigma \sin \beta_{HXi} \sin a_{0i} \cos a_{0i} \\ \Sigma \sin^2 a_{0i} \end{bmatrix}$$
(19)

WHERE:

$$DET = \begin{bmatrix} \Sigma \cos^2 \beta_{HXi} \cos^2 a_{0i} \\ \Sigma \cos \beta_{HXi} \sin \beta_{HXi} \cos^2 a_{0i} \\ \Sigma \cos \beta_{HXi} \cos a_{0i} \sin a_{0i} \end{bmatrix} \begin{bmatrix} \Sigma \sin \beta_{HXi} \cos \beta_{HXi} \cos^2 a_{0i} \\ \Sigma \sin^2 \beta_{HXi} \cos^2 a_{0i} \\ \Sigma \sin \beta_{HXi} \sin a_{0i} \cos a_{0i} \end{bmatrix} \begin{bmatrix} \Sigma \cos \beta_{HXi} \cos a_{0i} \sin a_{0i} \\ \Sigma \sin \beta_{HXi} \sin a_{0i} \cos a_{0i} \\ \Sigma \sin^2 a_{0i} \end{bmatrix}$$
(20)

$$\begin{bmatrix} \bar{x}_{LINE} \\ \bar{y}_{LINE} \end{bmatrix} = \begin{bmatrix} \bar{x}_{LLO} \\ \bar{y}_{LLO} \end{bmatrix} + \begin{bmatrix} \cos \psi_{LLO} & -\sin \psi_{LLO} \\ \sin \psi_{LLO} & +\cos \psi_{LLO} \end{bmatrix} \begin{bmatrix} \Delta \hat{x}_b \\ \Delta \hat{y}_b \end{bmatrix}$$
(21)

FIG. 17.

LINE LENGTH NAVIGATION SYSTEM

BACKGROUND OF THE INVENTION

1. Field of the Invention

The invention relates to a combination radio-dead reckoning system for the accurate guidance of moored vessels, for example, for undersea pipe or cable laying and more particularly relates to such a system for supplying position data when radio transmissions are absent. The system solves the problem by the manipulation of a number of parameters derived from sensors normally aboard a conventional pipe laying vessel and sensors cooperating with active winches applying tension to its several anchor lines. The vessel's pitch, roll, and heading angles are supplied from a marine gyro-compass and a vertical gyroscope. Anchor line elevation and azimuth angles with respect to deck coordinates are yielded by conventional angle pick offs associated with fairlead devices, as are the line axial tension and the length of anchor line paid out. Initial conditions, including the initial position of the vessel, are easily obtained in the usual manner. From certain of these parameters, the invention derives intermediate anchor line parameters for use in computing fairlead motion.

The intermediate data is used to compute compensated fairlead motion data by first computing apparent fairlead motion from anchor line tension changes. This version of fairlead motion contains undesired terms due to apparent fairlead motion caused by anchor line length changes and also due to actual fairlead motion caused by vessel attitude changes. Therefore, second and third computations are made of the contributions of the latter effects. This is done so that apparent fairlead motion due to anchor line length change and actual fairlead motion due to vessel attitude change may be subtracted from the measure of apparent fairlead motion as calculated from anchor line tension change, yielding the desired compensated fairlead motion value free of significant disturbing components. An estimated value of vessel position change is then obtained by least squares estimation involving these fairlead motion terms. Correction of vessel position then follows by cooperative operation of the winch and thruster assemblies.

2. Description of the Prior Art

Before an undersea pipe-lay campaign is begun according to past practice, a survey is made of the area involved. Based on bottom profiles made with depth sounders, a suitable route is determined for the pipe and is mapped. As the pipe is being laid, actual pipe position is drawn on the map by operators on board the pipe-lay vessel. The pipe position is determined by combining the known value of vessel position and the pipe touch down location relative to the vessel. This later can be determined by several methods, one of which is by the use of an underwater vehicle with television cameras.

After several sections of pipes are laid, vessel position is determined using a suitable radio positioning device. The actual and desired pipe routes are examined, and a determination is made as to the direction in which the vessel is to be moved. The winch operators are then asked to correct the position error by moving the vessel in the proper direction over the next several warps. The operators then cause the vessel to be warped or moved in the desired direction one section-length so as to line up the pipe joints in the weld stations, and then welding of another section of pipe is started. This continues until the pipe is once again being placed on the proper route.

The position determination as described above is done after every pipe section is laid, or less frequently depending on the depth and the condition of the seabed. The operators move the vessel using the winches or thrusters. They may use winches only, thrusters only, or winches and thrusters together.

Control of the winches may be performed by several operators, for example, three:

1. the forward winch operator, handling the six forward winches using one hand-controller for each winch,
2. the aft winch operator, for the six aft winches, there again being one-hand controller for each winch, and
3. the winch director, who has a console which can control all winches, again using one hand-controller for each winch.

Control of the winches has been performed by the forward and aft operators cooperating as a pair, or by the winch director alone.

The control of six winches is difficult and requires experience. In general, an operator (the forward winch operator, for example), is commanding only four winches, because normally not all six anchors are set. Two of those in use are generally placed more or less along the pipe-route; i.e., forward and the other two (or one) to the side. Thus, to move forward along the pipe route, the operator generally needs only to command two of the winches. The aft winch operator similarly controls his winches. Sideways movements and movements necessitating heading changes are more complex. The thruster operator, who is distinct from the three winch operators, controls all four thrusters. He can command the thrust (forward or reverse) and azimuth angle (360°) of the thrusters as pairs only. That is, the forward two thrusters always thrust together in the same direction, and the aft thrusters likewise.

There are many problems associated with manual control. Operation is satisfactory in relatively shallow water, since the cables are then tight, and the winches respond relatively rapidly to operator commands. However, as depth increases, winch response becomes increasingly sluggish due to the long length of cable involved and the attendant decrease in the effective spring constant of the cable, making manual control difficult. With increasing depth or adverse sea-bed conditions, a position determination is required more and more often so as to chart the pipe route accurately. Thus, a reliable method of position determination becomes a requirement.

Accurate knowledge of the pipe location depends upon accurate knowledge of vessel position. Two known types of radio positioning systems for locating the vessel itself with sufficient accuracy are the line-of-sight radio ranging system, which obtains position by measuring range to two shore stations whose positions are accurately known by survey, and a lower frequency non-line-of-sight system that generates two hyperbolic lines of position by measuring phase differences between the signals received from pairs of shore stations. This latter method is very similar to Loran except that the frequency is higher and accuracy is better.

The line-of-sight system is the more accurate of the two systems and is capable of operation 24 hours a day. However, range capability is rather small, and operation outside of the range of the shore stations cannot be achieved. In addition, rain adversely affects operation.

The hyperbolic system effectively eliminates the range problem, although its accuracy is somewhat less than the line-of-sight system. However, it suffers from erratic operation, or no operation at all in hours of twilight and dark due to changes in the ionosphere which affect the transmission of the radio signals required. In addition, movement of large cranes on-board the vessel adversely affects the medium frequency hyperbolic system. This erratic operation presents serious problems during any campaign which requires a substantially continuous knowledge of vessel position. If automatic operation is used, as is expected to be necessary with increasing depth and adverse sea-bed conditions, continuous positional data is a requirement. Thus, any cessation of radio navigation data is a serious matter.

The fact that a radio navigation system that can supply accurate positional fix data is used on-board the vessel, and that this type of navigation system normally stops operating periodically, suggests the additional use of a dead-reckoning system to fill in the gaps between periods of radio position data, either of the velocity dead-reckoning or the inertial dead-reckoning types. In velocity dead-reckoning, the last good radio position data is extrapolated using vessel velocity as measured by a speed log affixed to the vessel. Velocity is integrated, thus giving position change from the last radio position, and hence a value of vessel position. Unfortunately, any error in velocity will also be integrated, causing a build-up of position error. These velocity errors can be due to speed log sensor errors or changes in water currents. The latter causes errors since the speed logs measure vessel velocity with respect to the water, and water current must be removed to obtain vessel ground velocity for integration. Even under the best of circumstances, a dead-reckoning scheme of this sort will cause error build-up of sufficient magnitude to affect pipe-lay operation adversely in a period of minutes, while the radio data outage is expected often to last overnight.

The error build-up is a funtion of time since this dead-reckoning process is time integration. The pipe-lay vessel, however, moves very slowly; i.e., one length of pipe (about 12 to 24 meters) in anywhere from ten minutes to an hour depending on the diameter of pipe being laid and, hence, the amount of welding that must be done. Thus, dead-reckoned position error build-up will reach sufficient magnitude to affect operation before very many sections of pipe can be laid. During critical conditions, this can even require operation to cease.

The inertial system is an improvement over the dead-reckoning scheme; but, it also is a dead-reckoning system wherein vessel velocity is obtained by integration of accelerometer data and, hence, position by a further integration. Disadvantages of this system are first its very large penalty in terms of initial cost, and then in terms of maintenance requirements and their cost. In addition, this dead-reckoning process is also a time integration as is the first scheme and, even though better than the former, simply slows down the error build-up. A high quality marine inertial navigator has an error build-up of about 70 meters per hour, which is unacceptable for pipe laying operations.

SUMMARY OF THE INVENTION

The line length positioning system of the present invention overcomes the disadvantages of the prior art and especially makes it possible for a pipe-laying vessel to continue operation when radio communication of positional data is not functioning. In principle, it is a dead-reckoning system, but it is configured in a novel manner which overcomes the problems of the prior art. In operation, the line length system is periodically initialized to vessel position as determined by the radio system being used. Line length measurement would normally not be used when the radio system is functioning, since the radio system is more accurate and, more important, is a deterministic system which is never subject to dead-reckoning errors.

If the radio system malfunctions or is unable to provide ship's position data, the line length system is used to obtain position based on the last good values of radio position. The pipe laying operation may then continue. Normally, when using a hyperbolic radio system, the line length system will be utilized approximately half of the time; i.e., during twilight and night, and the radio system the other half. The line length system is capable of operation during the entire night time period, whereas the previous dead-reckoning systems are not. Although the line length system is indeeed a dead-reckoning system, it is not based upon time integration. Instead, measurements of the pertinent line parameters are taken, are compared to those values as measured at initialization of the line length system, and a position change is determined which, when added to initial position, yields a value of true vessel position. Since no time integration is required, the error build-up is not a direct function of time from initialization as in the other dead-reckoning systems, but rather is a function of distance travelled.

As an example, consider the case of a vessel which does not move appreciably during the time from initialization, but rather moves periodically about some reference position. During this entire period of time, the position, as calculated from the line length function, is in error; but the expected error of each position determination (which is done essentially continuously) is the same, regardless of how long a period of time has elapsed. Again, this is due to the fact that time integration is not performed. The velocity dead-reckoning and inertial systems, however, continually build-up error, regardless of the fact that the vessel is not moving appreciably. Since the vessel moves slowly, the error build-up during a night is small enough to allow operations to continue. Thus, the line length system considerably increases the productive time of the vessel. Furthermore, the system of the present invention responds rapidly and makes control possible at extreme depths.

BRIEF DESCRIPTION OF THE DRAWINGS

FIGS. 5a and 5b taken together constitute a block diagram showing invention components and their interconnections, and indicating figure numbers in which details are presented.

FIG. 6 is a detailed circuit diagram of the freeze-initial-values-device 106 of FIG. 5a.

FIGS. 16 and 17 show primary equations useful in explaining the operation of the invention.

DESCRIPTION OF THE PREFERRED EMBODIMENTS

INTRODUCTION

Figure 1:
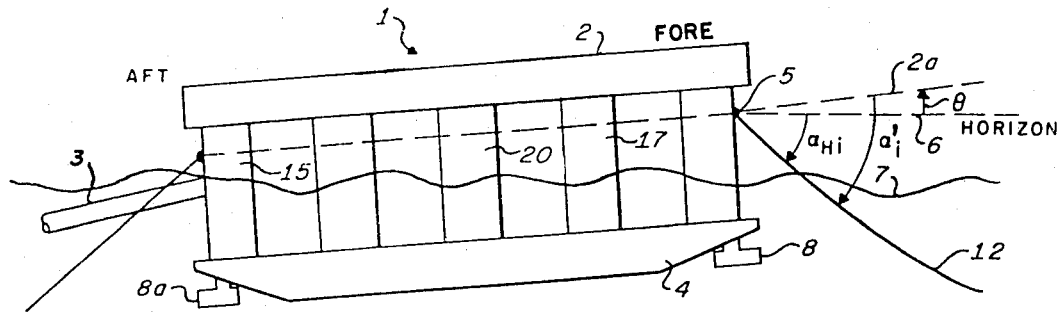
FIG. 1 is an elevation view of a large type of pipe-laying vessel on which the invention is employed.
Figure 2:
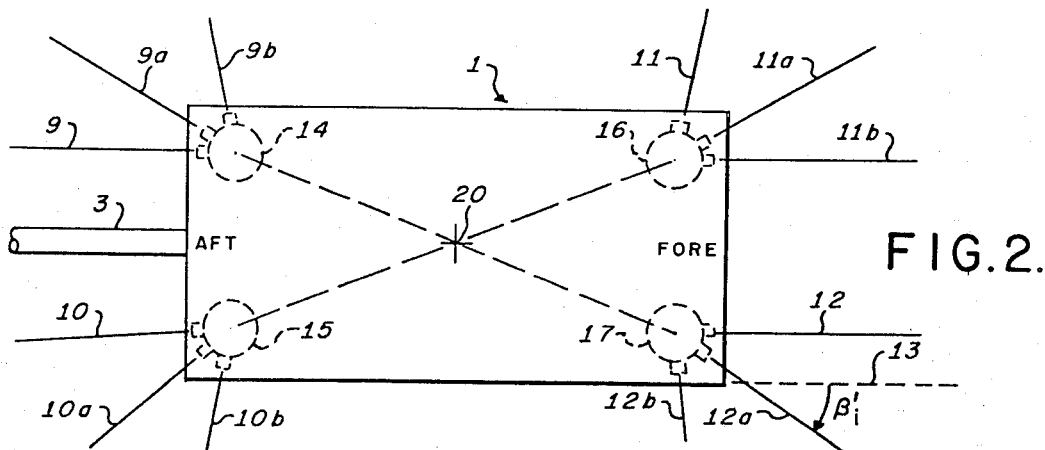
FIG. 2 is a plan view looking down on the deck shown in FIG. 1.

FIGS. 1 and 2 illustrate an environment in which the line length navigation system of the present invention may be employed, though it will be understood that the system will operate with any vessel which uses anchor cables, provided that there are a sufficient number of the latter and that cable parameters including tension, length, and angles may be readily measured. The pipe line laying vessel 1 illustrated may take any of several forms known in the art, including a recently devised semi-submersible vessel especially adapted to the problem. As shown in the FIGS. 1 and 2, the vessel 1 includes an upper deck 2 supported on columns such as columns 15, 17 above a buoyant but submerged hull 4 and also above the sea, lake, or river surface 7. Customarily, the surface of deck 2 provides an area for the progressive assembly of lengths of pipe supplied to the vessel by a service ship. As new lengths of pipe are assembled and are made unitary with the pipe line section 3 being lowered to the bottom of the water, the incremental forward movement and positioning of vessel 1 is controlled by a plurality of winches, each of which is located typically at a respective corner column 14, 15, 16, or 17 of vessel 1, and each of which is coupled by fairlead apparatus to a respective steel cable such as line 12, each such line being furnished with an anchor at its end remote frm the corresponding winch. The assembled pipeline section 3 is maintained under tension when the floated vessel is being moved away from the submerged pipe along the selected route for the pipeline. The cable tensioning apparatus enables pay out, under tension, of the assembled pipeline 3 as it is submerged. Additional tensioning apparatus assures, with the assistance of the several anchor winches, the maintenance under tension of the previously assembled and lowered section 3 of pipeline while additional sections of pipe are being welded to the free end of the pipeline.

The vessel 1 is equipped with sets of fairlead and associated sensor devices, normally one set at each of its four corners, for controlling the respective anchor lines 9, 9a, 9b; 10, 10a, 10b; 11, 11a, 11b; and 12, 12a, 12b. These fairlead devices are shown in more detail in FIG. 4 which, as will be further discussed, illustrates a representative design of the fairlead and sensor structure associated with each individual anchor line, the devices providing pulleys which serve as individual guides for the respective anchor lines as they leave or return to the vessel when it is required to move the vessel to a selected new position and also, when desired, for controlling incremental movement of the vessel during the pipe laying operation. The operation or operators may additionally or alternatively direct and energize thruster devices at each of the four corners of the submerged hull 4, as at 8 and 8a in FIG. 1. These conventional devices each swivel about respective nominally vertical axes and each may thus be caused to exert a selected thrust vector for cooperatively propelling the vessel to a desired new location. While the twelve fairlead devices shown in FIG. 2 are grouped at each column in sets to operate with three angularly spaced anchor lines, as lines 12, 12a, and 12b at column 17, fewer numbers of anchor lines may be employed, though the combination shown in FIGS. 1 and 2 is desirable because of its flexibility. Not all cable and fairlead mechanisms may necessarily be in operation at any one time. Furthermore, the line length navigation system of the present invention may be used with any number of lines greater than three attached in any of a variety of configurations to a variety of types of vessels.

GLOSSARY OF SYMBOLS

The following symbols will be referred to in discussing the line length navigation system of the invention:

$\alpha_i'$ = the angle from the $i^{th}$ anchor line to a first plane 2a parallel to the vessel deck as measured in a plane perpendicular to that first plane and passing through the $i^{th}$ line; as in FIG. 1, downward values are positive.

$\alpha_{Hi}$ = the angle from the $i^{th}$ anchor line to the horizontal plane 6 measured in a vertical plane; as in FIG. 1, downward values are positive.

$\beta_i'$ = the angle from the $i^{th}$ anchor line with respect to the fore-aft reference axis 13 measured in a plane such as plane 2a of FIG. 1 parallel the deck of the vessel; as in FIG. 2, the angle is called positive when clockwise looking down on the vessel deck 2.

$\beta_{Hi}$ = the angle from the $i^{th}$ anchor line to the projection of the fore-aft axis of the vessel onto the horizontal plane as measured in the horizontal plane; i.e., the azimuth angle of the $i^{th}$ line. It is called positive when clockwise looking down on the vessel deck 2.

$\theta$ = the vessel pitch angle; called positive when the vessel's bow is up.

$\phi$ = the vessel roll angle; it is measured positive when the vessel starboard is down.

$S_1'$ = the axial tension in the $i^{th}$ anchor line.

$L_i'$ = the total length paid out of the $i^{th}$ anchor line.

$\psi_H$ = the vessel true heading angle measured clockwise.

$L_{LLOi}$ = the initial value of the length paid out of the $i^{th}$ anchor line.

$S_{LLOi}$ = the initial value of the axial tension in the $i^{th}$ anchor line.

$\psi_{LLo}$ = the initial value of vessel heading.

$\overline{X}_{LLo}$, $\overline{Y}_{LLo}$ = initial values of vessel position.

Figure 3A:
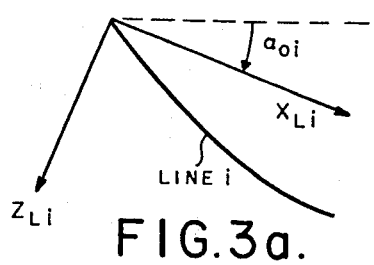
FIGS. 3A and 3B are diagrams useful in explaining operation of the invention.

$X_{Li}$, $Y_{Li}$, $Z_{Li}$ = a coordinate system set up, as will be seen, for convenience in calculations to follow, and as shown in FIG. 3a. It is oriented so that the $X_{Li}$, $Z_{Li}$ plane is in the vertical plane of the $i^{th}$ anchor line. The $X_{Li}$ axis is defined as being at an angle $\alpha_{oi}$ with respect to the horizontal 6. The value of $\alpha_{oi}$ is conveniently chosen so as to cause $$\frac{\partial S_i'}{\partial Z_{Li}} = 0.$$

$N_{Li}$ = the $i^{th}$ anchor line length sensitivity; that is, the proportionate change in axial tension if there is a small change in line length without any attendant change in fairlead position; i.e.

$$\frac{\partial S_i'}{\partial L_i}.$$

$N_{Xi}$ = the $i^{th}$ anchor line position sensitivity in the $X_{Li}$ direction; that is, the proportionate change in axial tension if there is a small motion of the fairlead in the $X_{Li}$ direction without any attendant change in any other direction, and, in addition, no change in line length; i.e.,:

$$\frac{\partial S_i'}{\partial X_{Li}}.$$

$\Delta S_i$ = the change in tension from the initial value for the $i^{th}$ anchor line.

$\Delta L_i$ = the change in line length from the initial value for the $i^{th}$ anchor line.

$\Delta \psi_{LL}$ = the change in vessel heading from its initial value.

$\delta_{HXi}$ = the azimuth angle of the $i^{th}$ anchor line with respect to the vessel's initial heading.

$\alpha_{oi}$ = the vertical angle of the $i^{th}$ anchor line coordinate system with respect to the horizontal 6, measured positive down.

$\Delta X_{LfSi}$ = a component of the $i^{th}$ fairlead motion change along the $X_{Li}$ direction as calculated from line tension change.

$\Delta X_{LfLi}$ = a component of the $i^{th}$ fairlead motion change along the $X_{Li}$ direction as calculated from line length change.

$\Delta X_{Lfai}$ = a component of the $i^{th}$ fairlead motion change along the $X_{Li}$ direction due to vessel attitude change.

$\Delta X_{Lfti}$ = a component of actual translational motion of the $i^{th}$ fairlead along the $X_{Li}$ direction.

$\Delta \hat{X}_b$, $\Delta \hat{Y}_b$ = best estimates in a least-squares sense derived from the $\Delta X_{Lfti}$ values for all available anchor lines.

With respect to the glossary of symbols, two definitions should be understood. First, measurement is defined as a single determination of the value of a quantity by some means. This determination contains some error the size of which depends upon many factors such as the method of measurement. Secondly, estimated value is a value of the quantity in question computed by some statistical means from several measurements of the quantity. It is expected to have less error than any one single measurement. A well known method is to average several measurements. Also, the symbol ‾ means the best estimate in the least square sense of the value.

Figure 3B:
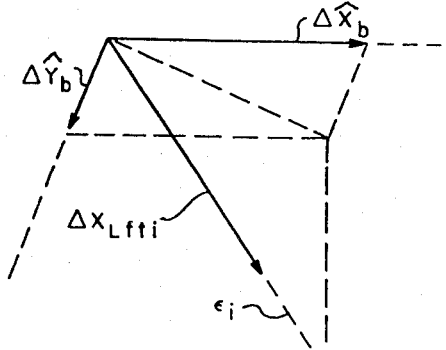

In the present situation, the choice is to use the least-squares method in computing the estimate of vessel position change ($\Delta \hat{X}_b$, $\Delta \hat{Y}_b$) from the measurements $\Delta X_{Lfti}$. In light of the above $\Delta \hat{X}_b$, $\Delta \hat{Y}_b$ is the best estimate, in a least-squares sense, of the value of vessel position change in the horizontal plane, as derived from the $\Delta X_{Lfti}$ values determined for all available anchor lines. That is, $\Delta \hat{X}_b$, $\Delta \hat{Y}_b$ is chosen so as to minimize the sum of the squares of the error, $\epsilon_i$, between the value $\Delta X_{Lfti}$, i.e., fairlead motion along $X_{Li}$, and the corresponding value as derived from $\Delta \hat{X}_b$, $\Delta \hat{Y}_b$ (see FIG. 3b).

$\overline{X}_{LINE}$, $\overline{Y}_{LINE}$ = vessel actual position as derived by the novel line length navigation system.

$R_{FXi}$, $R_{FYi}$, $R_{FZi}$ = the location of the $i^{th}$ fairlead with respect to the line length navigation system reference point 20. The latter is a reference point for navigation purposes irrevocably affixed to the vessel. It will be seen that point 20 is located at the intersection of the imaginary lines joining the center of elements 14, 15, 16, 17 in FIG. 2 in the plane containing the fairlead centers (FIG. 1).

$\overline{\sin \alpha_{Hi}}$ = the filtered value of the quantity $\sin \alpha_{Hi}$.

$\overline{\cos \alpha_{Hi}}$ = the filtered value of the quantity $\cos \alpha_{Hi}$.

$\omega$ = weight in the water floating the vessel of a unit length of the anchor line.

It will be understood that the subscript i indicates that there are as many of the subscripted parameters as there are available anchor lines.

SENSORS

Operation of the novel system depends upon receiving data from certain sensors shown in FIG. 5a including a conventional vertical gyroscope 80 from which ship's pitch angle $\theta$ and roll angle $\phi$ are derived as selsyn voltages on leads 81 and 82 in a conventional manner. Also, a conventional gyroscopic or other compass 88 is used to generate selsyn voltages on leads 91 representative of the vessel heading angle $\psi_H$ in the usual way.

Figure 4:
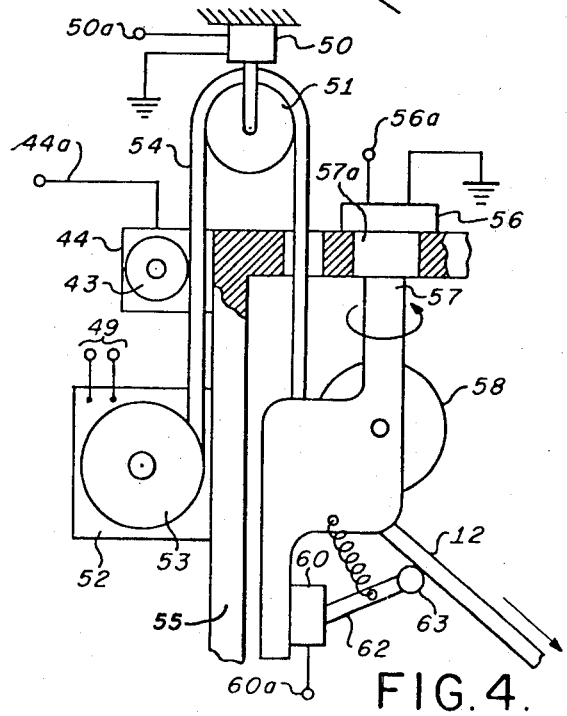
FIG. 4 is an elevation view of one of the fairlead mechanisms of FIGS. 1 and 2 showing associated sensors.

Other signals are supplied by sensors associated with each of the twelve fairlead devices, one of which devices is shown in detail in FIG. 4. In this apparatus, a winch drum 53 controlled by electrical signals coupled to leads 49 of reversible motor 52 is mounted on a frame portion 55 of the ship. Motor 52 determines the tension on anchor line segment 54 which is wound over pulley 51. Pulley 51 is coupled to a yoke that is suspended for vertical translation from the vessel's structure 55 via a conventional load cell or pick off 50 for supplying a measure at terminal 50a of the axial tension $S_i'$ in the anchor line 12. From pulley 51, line 12 extends downwardly in contacting relation with fairlead pulley 58 and then out away from the vessel 1 toward the associated anchor. The yoke 57 supporting pulley 58 is journalled for rotation about a nominally vertical axis within a suitable friction-free bearing 57a mounted in the frame 55 of vessel 1. A conventional angle pick off 56 affixed to frame 55 provides an electrical measure of the angle $\beta_i'$ between the plane of pulley 58 and therefore of line 12 and the corresponding reference direction 13 of FIG. 2. A conventional angle sensor 60 is mounted on an extension of yoke 57 for generating a measure of the angle $\alpha_i'$ at electrical terminal 60a. The end 63 of rod 62 is urged against anchor line 12 by spring 61 so that the rod 62 determines the angular position of the rotor of pick off 60 in the conventional manner. In this way, pulleys 51 and 58 serve as guides for anchor line 12 as it is played out or reeled in with respect to vessel 1, pulley 58 being allowed to swivel about its axis so as to accommodate azimuth movement of anchor line 12. A counter or length measurement device 44 includes a pulley 43 contacting line segment 54 for supplying an electrical measure at terminal 44a of the amount $L_i'$ of line 12 that has been paid out. As previously noted with respect to FIGS. 1 and 2, twelve of the fairlead devices such as shown in FIG. 4 are associated with the respective anchor lines, three being typically affixed to each of the four corner columns 14, 15, 16, 17 of the vessel. It will be understood by those skilled in the art that a variety of sensors is available for the electrical measurement of angles such as angles $\beta_i'$ and $\alpha_i'$, the axial tension in the several anchor leads, and the amount of line paid out.

THE LINE LENGTH NAVIGATION SYSTEM

Figure 5B:
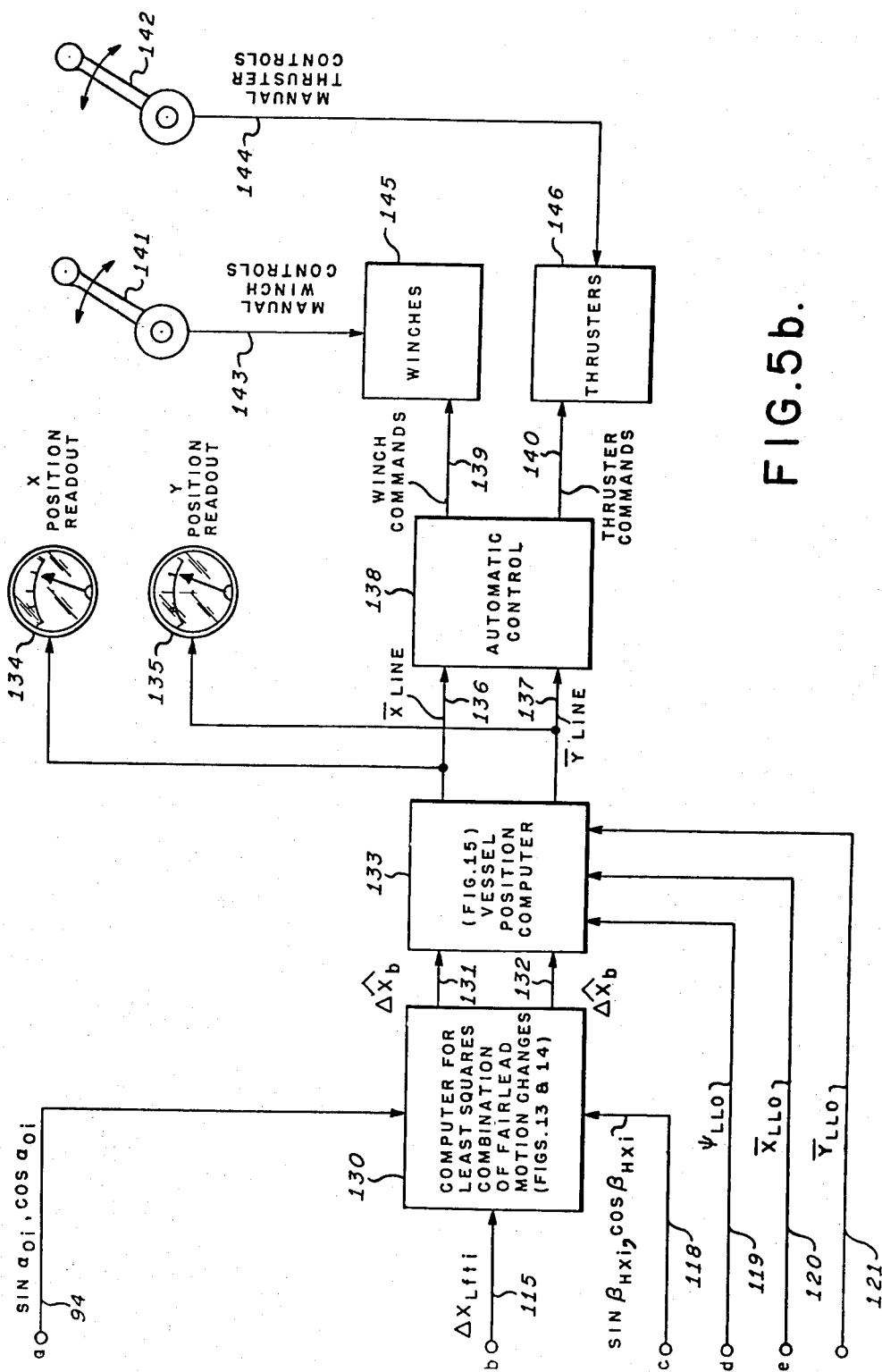

FIGS. 5a and 5b provide a block diagram of manual and automatic versions of the novel line length navigation system, showing the major components of the system and their electrical interconnections and including the several sources of input data. For example, vertical gyroscope 80 provides electrical signals representative of the respective values of angles $\theta$ and $\phi$ on electrical leads 81 and 82 for dual uses in the illustrated system. The lot of sensors associated with the several winch and fairlead systems, indicated at 83 in FIG. 5a, provides the electrical measures of the angle values $\alpha_i'$ and $\beta_i'$ on the respective electrical leads 84 and 85, along with electrical measures of the values of the total length $L_i'$ of each of the anchor lines and of the tensions $S_i'$, which measures appear on leads 86 and 87. Compass 88 supplies the vessel with electrical signals representative of heading angle in the usual manner on leads 91.

A first set of computations is performed by computers 93 and 100 with the aid of the device 106 for freezing certain initial electrical values when a suitable conventional command is applied to terminal 106a. The device 106 is supplied via leads 89,90 and 92 with the respective current values $L_i'$, $S_i'$, and $\psi_H$; it will be discussed in further detail with reference to FIG. 6. At the start of operation, these respective current values may be frozen as initial values by device 106 and supplied as initial values in the usual manner on command via the respective leads 105a, 105b, and 105c as electrical values representing $S_{LLoi}$, $L_{LLoi}$, and $\psi_{LLo}$ to computer 100. The latter value will also be used elsewhere in the system, as will be described.

To aid in the operation of computer 100, certain operations are performed by computer 93, which remains to be discussed in greater detail with reference FIGS. 8 and 9. Computer 93 accepts as inputs electrical signals representing the several angle values $\theta$, $\phi$, $\alpha_i'$, and $\beta_i'$ found in the respective input leads 81, 82, 84, and 85 and serves as a computer of several anchor line perameters. For example, it generates electrical signals representing sin $\alpha_{oi}$ and cos $\alpha_{oi}$ values on the multi-lead 94 and similarly generates signals representative of sin $\beta_{Hi}$ and cos $\beta_{Hi}$ values on multi-lead 98. The latter two values are fed by multi-lead 98 to computer 100. Also generated by computer 93 are the sensitivity values $N_{Li}$ and $N_{Xi}$ as additional electrical values.

Thus, the computer 100 for deriving electrical values representing changes from the selected initial values responds to the initial condition signals set up on leads 105a, 105b, and 105c, to the angle value $\psi_H$ on lead 91, to $L_i'$ and $S_i'$ signals on the respective leads 86 and 87, and to the sin $\beta_{Hi}$ and cos $\beta_{Hi}$ signals representing values on multi-lead 98. The response by computer 100, as will be discussed with respect to FIG. 7, includes generation of four outputs, a signal representing the incremental change $\Delta S_i$ in axial anchor line tension on electrical lead 101, a signal representing the incremental change $\Delta L_i$ in anchor line length on electrical lead 102, a signal representing the incremental change $\Delta \psi_{LL}$ in vessel heading on lead 103, and the electrical signal representing the values sin $\beta_{HXi}$ cos $\beta_{HXi}$ on leads 104.

The several computed values emanating from computers 93 and 100 are now used in further computations, in three distinct ways, of fairland motion; separate calculations are made of fairlend motion from the value $\Delta S_i$ of anchor line tension change, from the value $\Delta L_i$ of anchor line length change, and from the ship's attitude change values $\Delta \psi_{LL}$, $\theta$ and $\phi$ in association with sin $\beta_{HXi}$, cos $\beta$HXi. For example, the computer 110 for fairlead motion as calculated from anchor line tension change converts the signal $\Delta S_i$ value on lead 101 and the signal $N_{Xi}$ value on leads 97 and 99 into the signal of value $\Delta X_{Lf Si}$ on lead 111, which latter represents a component of fairlead motion change along the $X_{Li}$ direction. Computer 110 will be discussed in further detail with respect to FIG. 10.

In a generally similar way, computer 112 for determining fairlead motion from the anchor line length change $\Delta L_i$ on lead 102 is enabled in this operation by electrical signals representing both $N_{Li}$ and $N_{Xi}$ values on the respective outputs 96 and 97 of computer 93, as will be further discussed in connection with FIG. 11. Thus, a second of the desired electrical measures appears now on lead 113 of fairlead motion in the form of a voltage corresponding to the term $\Delta X_{LfLi}$.

Computer 117 for computing fairlead motion due to vessel attitude changes uses electrical signals representing the $\Delta \psi_{LL}$ and sin $\beta_{HXi}$, cos $\beta_{HXi}$ terms on the respective leads 103 and 104, as will be further described with reference to FIG. 12. In this manner, a third electrical measure now appears on lead 116 of fairlead motion. Finally, the incremental motion electrical values on leads 111, 113, and 116 are combined by a conventional summationd device 114, with polarities as indicated in FIG. 5a, producing as an output the differential electrical signal $\Delta X_{Lfti}$ on lead 115.

Referring now to FIG. 5b, eight terms in the form of eight electrical signals are yielded in the subsystems of FIG. 5a and are employed as inputs: signals representing sin $\alpha_{oi}$ and cos $\alpha_{oi}$ appear on multi-lead 94, $\Delta X_{Lfti}$ on lead 115, sin $\beta_{HXi}$, cos $\beta_{HXi}$ on lead 118, and $\psi_{LLo}$ on lead 119. Additionally employed in the computation system of FIG. 5b are signals representing $\overline{X}_{LLo}$ and $\overline{Y}_{LLo}$ on the respective leads 120 and 121; these are initial values of vessel reference position 20 as derived in a conventional manner from hyperbolic navigation receiver signals or from other radio or navigation data or position fix sources. The purpose of computer 130 is to compute the least squares combination of fairlead motion changes, as will be discussed in further detail from FIGS. 13a, 13b, and 14. These appear as electrical values on the output leads 131, 132 of computer 130 and are represented by $\Delta \hat{X}_b$ and $\Delta \hat{Y}_b$, the best estimates in a least-square sense derived particularly from the $\Delta X_{Lfti}$ electrical values for all available anchor lines. The symbol $\chi$ means the best estimate in the least square sense of the value.

The $\Delta \hat{X}_b$ and $\Delta \hat{Y}_b$ electrical terms on the respective leads 131, 132 serve as inputs to the vessel position computer 133, along with the aforementioned signals of leads 119, 120, 121. Computer 133 operating in detail as remains to be described with respect to FIG. 15, supplies signals outputs on leads 136, 137 to displays 134, 135 or to a conventional automatic control system which forms no necessary part of the present invention. The function of automatic control 138 in supplying winch and thruster commands via the respective leads 139 and 140 to winches 145 and thrusters 146 may be replaced or overriden by manual controllers 141, 142 for generating electrical control signals found on leads 143, 144.

INITIAL VALUE DEVICE 106

Figure 6:
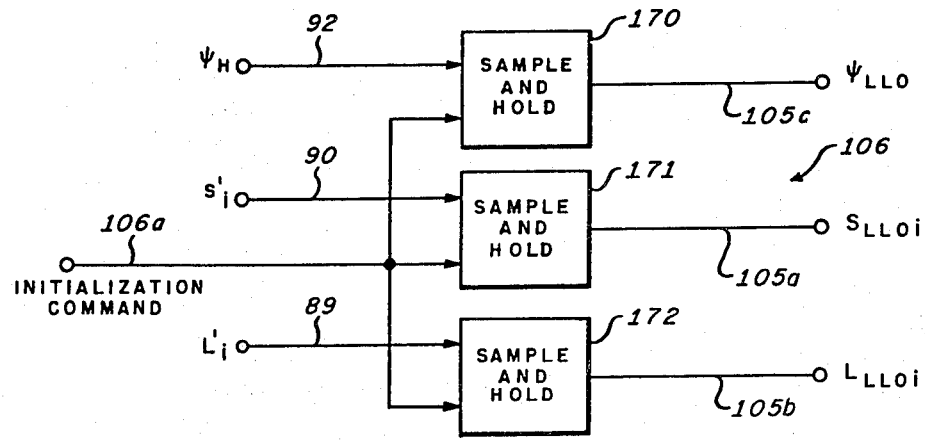

The device 106 for supplying initial values from the electrical inputs $\psi_H$, $S_i^{40}$, and $L_i'$ on the respective leads 92, 90, and 89 is shown in more detail in FIG. 6 as including three similar conventional sample-and-hold circuits 170, 171, 172, each receiving one of the foregoing inputs. The sample-and-hold circuits are each supplied with a second input via terminal 106a which is, in each case, an initialization command supplied in the usual way as a hold command signal to each circuit 170, 171, 172. In this manner, an initial electrical value of each of the three input variables is stored and is available for subsequent use. These are the terms representing $\psi_{LLo}$, $S_{LLoi}$, and $L_{LLoi}$ which may be coupled by the respective leads 105c, 105a, 105b in particular to computer 100 for computing changes from these initial values for supply, in turn, to computers 110, 112, 117 and 130.

It will be understood that the FIG. 6 configuration will be repeated for each available anchor line. Since the line length navigation apparatus must measure position change from an initial ship's position, the devices 106 measure values of ship's heading and the values of anchor line tension and length paid out for each available anchor line at the initial time and stores these values.

COMPUTER 100 FOR COMPUTING CHANGES FROM INITIAL VALUES

Figure 7:
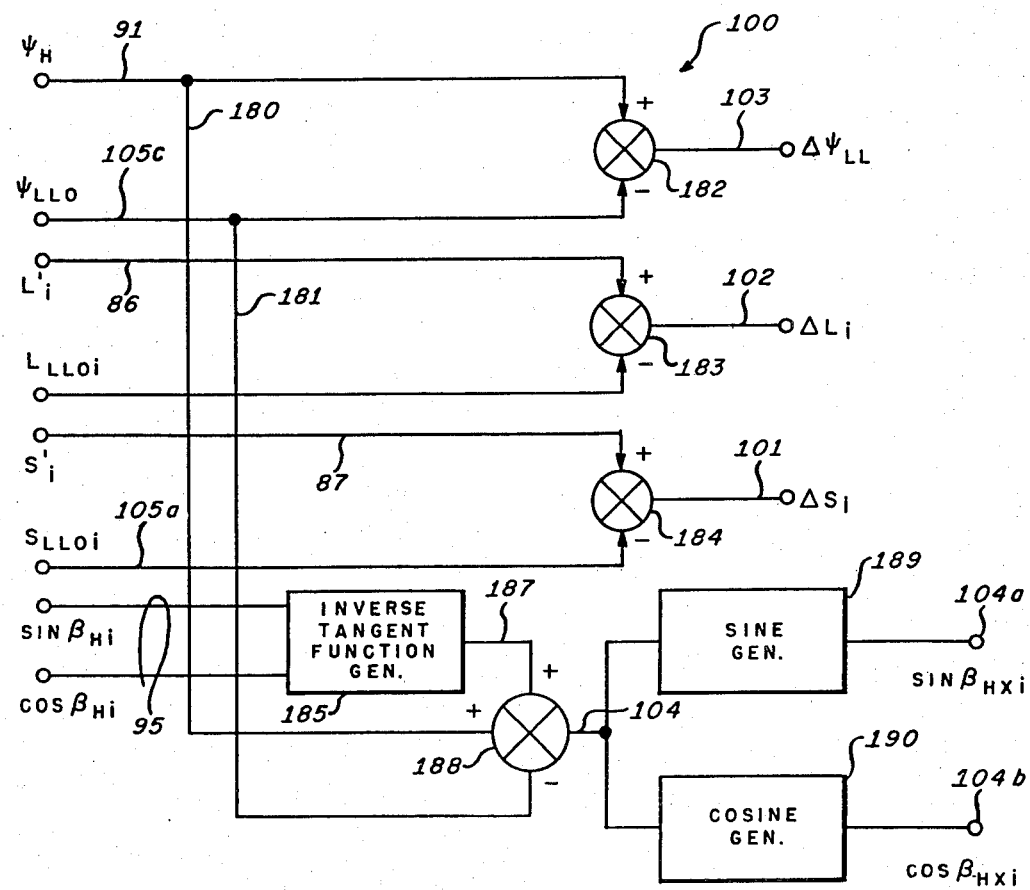
FIG. 7 is a detailed circuit diagram of the computer 100 of FIG. 5a for changes from initial values.

The computer 100 for computing changes from initial values is shown in more detail in FIG. 7. In this device, the ship's heading value $\psi_H$, as supplied by electrical signals from compass 88 on lead 91, and the initial electrical value $\psi_{LLo}$ on lead 105c are coupled to a conventional summation device 182 with polarities as shown in the drawing to yield the electrical output $\Delta \psi_{LL}$, the change in vessel heading from its original course, an output lead 103. In a similar way, the winch sensor 44 electrical value $L_i^{40}$ on lead 86 and the initial value $L_{LLoi}$ on lead 105b are coupled to a second conventional summation device 183 in the polarity shown to yield the signal $\Delta L_i$ on lead 102, which is the change in anchor line length from its initial value. The anchor line tension value $S_i^{40}$, an electrical signal on lead 87 and the corresponding initial value $S_{LLoi}$, an electrical signal on lead 105a, are connected to inputs of summation device 184 in the polarity shown to yield the incremental value $\Delta S_i$ as an electrical signal on lead 101. The sin $\beta_{Hi}$ and cos $\beta_{Hi}$ electrical values on leads 95 are supplied to perform a trigonometric conversion in the conventional inverse tangent function generator 185, providing an electrical signal representing the value $\beta_{Hi}$ on its output 187 which is coupled to one input of the conventional summation device 188 in the polarity shown. Leads 180, 181, respectively branching from leads 91, 105b, supply electrical values $\psi_H$ and $\psi_{LLo}$ to two other inputs in the illustrated relative polarities of summation device 188, thus yielding an electrical measure representing $\beta_{HXi}$ on lead 104, the azimuth angle of the anchor line with respect to the ship's initial heading. The signal $\beta_{HXi}$ is then converted in sine and cosine generators 189, 190 into the respective sin $\beta_{HXi}$ and cos $\beta_{HXi}$ signals found on the respective leads 104a, 104b. As noted in the foregoing, the four electrical outputs of computer 100 are employed in the operation of further computers 110, 112 and 117.

Thus, computer 100 takes stored electrical values from device 106 and calculates the change in ship's heading and anchor line tension and length from those stored values. Tension and anchor line length is derived for each available anchor line. In addition, the signals representative of the sines and cosines of azimuth angles $\beta_{HXi}$ for each available anchor line with respect to the vessel heading stored at the time of initialization are calculated. Accordingly, the calculations made by computer 100 may be represented as in Equations 1 through 4 in FIG. 16.

COMPUTER 93 FOR ANCHOR LINE PARAMETERS

Figure 8:
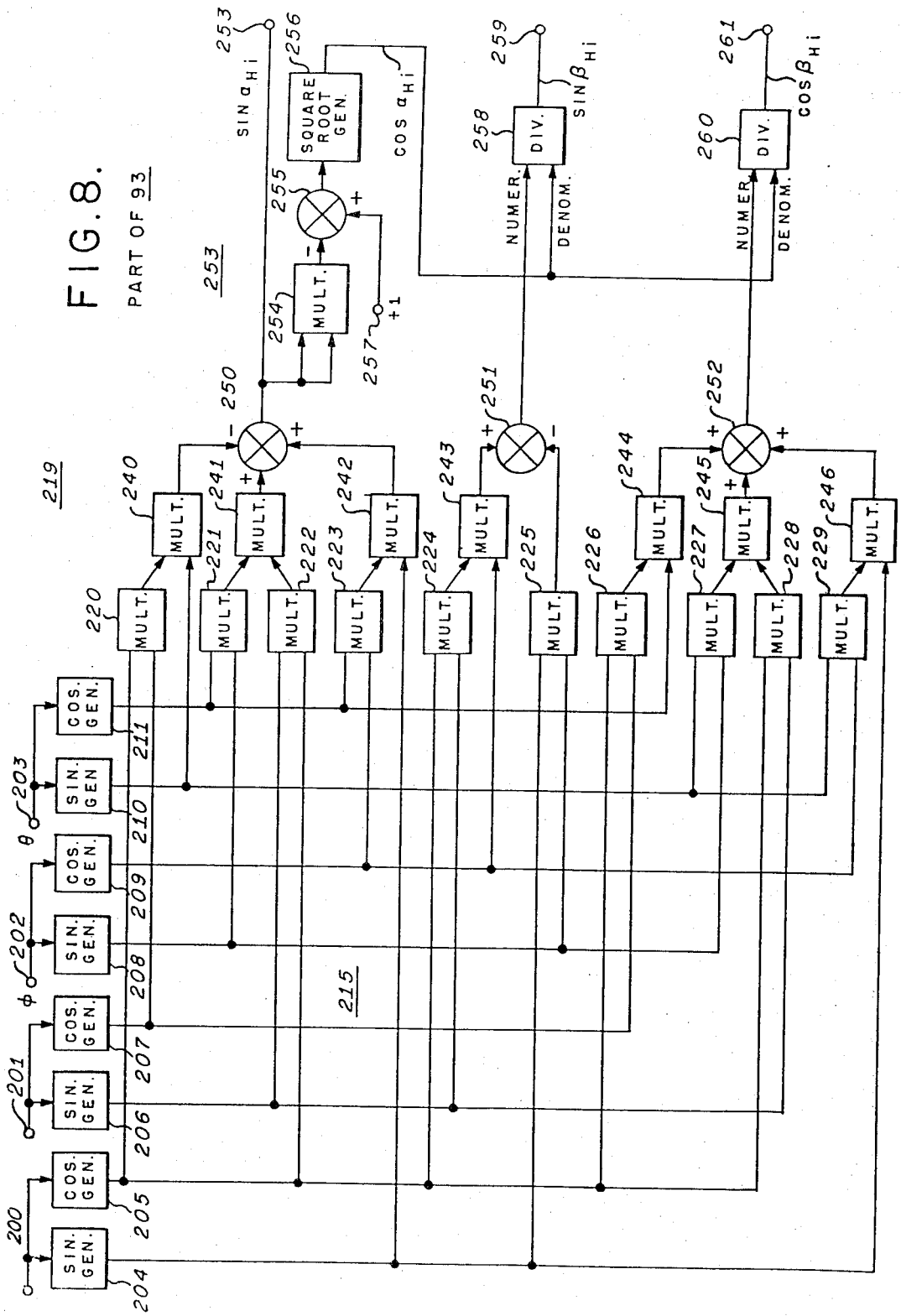
FIGS. 8 and 9 together provide a detailed circuit diagram of the computer 93 of FIG. 5a for anchor line parameters.
Figure 9:
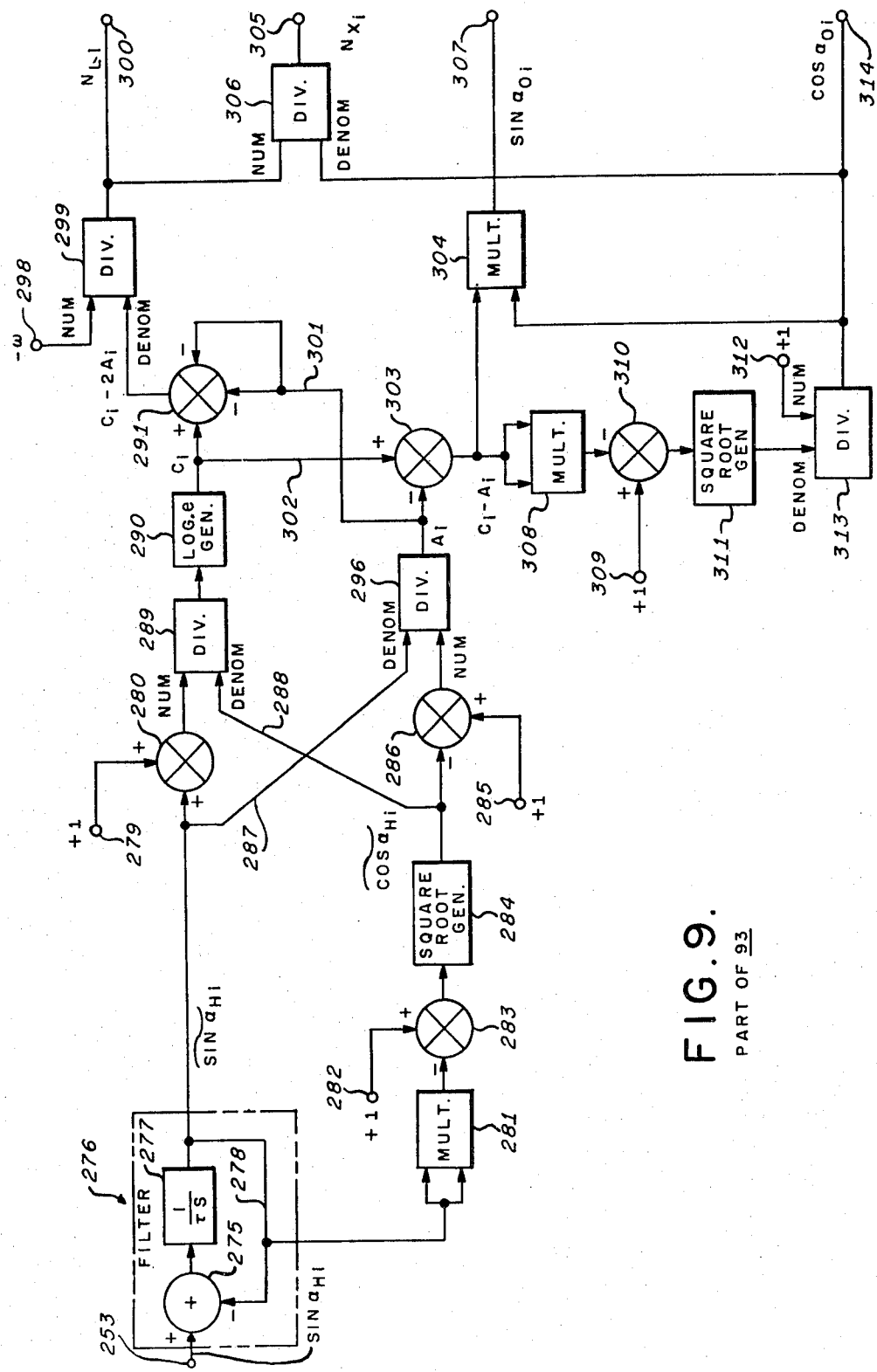

The computer 93 for the anchor line parameters is the relatively more complex device shown in FIGS. 8 and 9. Its inputs are electrical representations of $\alpha_i^{40}$, $\beta_i'$, $\phi$ and $\theta$ found on the respective terminals 200, 201, 202, 203. Its function is to aid in the supply of electrical representations of the functions sin $\alpha_{oi}$, cos $\alpha_{oi}$, sin $\beta_{Hi}$, cos $\beta_{Hi}$, $N_{Li}$, and $N_{Xi}$ as seen also in FIG. 5a. In particular, it provides for the transformation of the measured anchor line angles $\alpha_i'$ and $\beta_i'$, which are measured in deck coordinates, into the horizontally stabilized angles $\alpha_{Hi}$ and $\beta_{Hi}$.

Referring particularly to FIG. 8, signals representative of $\alpha_i^{40}$ are coupled as inputs to sine generator 204 and to cosine generator 205. Signals representative of $\beta_i^{40}$ are coupled to sine generator 206 and to cosine generator 207. In a similar manner, the angle signal $\phi$ is supplied both to sine generator 208 and to cosine generator 209. Furthermore, the angle signal $\theta$ is supplied to sine generator 210 and to cosine generator 211.

The outputs of the several sine and cosine function generators 204 through 211 are supplied through connector matrix 215 to predetermined inputs of a plurality 219 of conventional primary multipliers 220 through 229 and also of conventional secondary multipliers 240 through 246. For example, the output of sin $\alpha_i^{40}$ generator 204 is coupled to multipliers 242 and 225. The output of cos $\alpha_i^{40}$ generator 205 is led to multipliers 220, 222, 224, 226, and 228. The output of sin $\beta_i'$ generator 206 is supplied to multipliers 222, 224 and 228. The output of cos $\beta_i^{40}$ generator 207 goes to multipliers 220 and 226. The signals from sin $\phi$ generator 208 are supplied to multipliers 221, 225, and 227. The signals from cos $\phi$ generator 209 are lead to multipliers 223, 243, and 229. Finally, the ouputs of sin $\theta$ generator 210 go to multipliers 240, 227, and 229, while those from cos $\theta$ generator 211 flow to multipliers 221, 223, and 244.

To complete the operation of the multiplier matrix 219, additional connections are made between predetermined multipliers within the matrix. A second input of multiplier 240 is supplied by multiplier 220. Multipliers 221 and 222 supply both of the inputs of multiplier 241. One input of multiplier 242 is supplied by multiplier 223 and one input of multiplier 243 is supplied by multiplier 224. Multiplier 226 supplies a second input to multiplier 244. Both inputs of multiplier 245 come from multipliers 227, 228. Finally, one input of multiplier 246 comes from multiplier 229.

Final manipulations of the signals occur in section 253 of FIG. 8, where the outputs of multipliers 240, 241, 242 are combined by the conventional summation device 250, in the polarities shown in the figure, to generate signals representing sin $\alpha_{Hi}$ at terminal 253. Signals representing cos $\alpha_{Hi}$ are needed to further computations within the line length navigation computer and these signals are generated by squaring the term sin $\alpha_{Hi}$, which latter term serves as the two inputs to multiplier 254 which functions as a squaring circuit. The squared term is applied to summation device 255, a second input of which is supplied with a unity voltage generated in a conventional manner by a source (not shown) coupled to terminal 257. The inputs of summation device 255 are polarized as shown in the drawing. The output of summation device 255 is subjected to the action of square root extractor 256, which yields the desired signal representing cos $\alpha_{Hi}$ at the denominator inputs of conventional dividers 258 and 260.

The outputs of multipliers 243 and 225 are coupled to summation device 251 in the polarities indicated; the output of device 251, being connected to the numerator input of divider 258, causes it to yield sin $\beta_{Hi}$ on terminal 259. In a somewhat similar manner, the three outputs of multipliers 244, 245, 246 are coupled in the indicated polarities to individual inputs of summation device 252. The output of summation device 252, being connected to the numerator input of a divider 260, which may be similar to divider 258, causes it to yield cos $\beta_{Hi}$ at its output terminal 261. Accordingly, it will readily be understood that the computations performed by the part of computer 93 shown in FIG. 8 may be represented by the Equations 5 through 8 of FIG. 16. It will further be understood that the apparatus shown in FIG. 8 and in FIG. 9, which is yet to be described, is repeated for each of the available anchor lines.

Referring now to FIG. 9, which describes the second portion of the computer 93 for deriving the several anchor line parameters, it receives as an input a representation of the value sin $\alpha_{Hi}$ found on terminal 253 of FIG. 8 and yields signals representing $N_{Li}$, $N_{Xi}$, sin $\alpha_{oi}$, and cos $\alpha_{oi}$ on the respective output terminals 300, 305, 307, and 314. As will be recalled, the value $\alpha_{oi}$ in these trigonometric quantities is the angle of the anchor line coordinate system of the $i^{th}$ anchor line with respect to the horizontal; $N_{Xi}$ is the position sensitivity of the $i^{th}$ anchor line, while $N_{Li}$ is its length sensitivity.

The input at terminal 253 is first filtered by a conventional filter 276 having a time constant of about three minutes, for example, which will include a device 277 determining the filter transfer function in the usual way, along with an input summation device 275, polarized as shown, and a feed back path 278 from the output of the filter 276 to one input of summation device 275. The line length system uses the quantities $\alpha_{oi}$, $N_{Xi}$, and $N_{Li}$ which are derived from $\alpha_{Hi}$ or, more precisely, sin $\alpha_{Hi}$ and cos $\alpha_{Hi}$. Instead of using these quantities directly, however, it is desirable to smooth them so as to remove perturbations caused by wave motion, vessel periodic motion, repetitive sensor and computation errors, etc., thereby obtaining values of $\alpha_{Hi}$, $\alpha_{oi}$, $N_{Xi}$, and $N_{Li}$ which are more representative of steady-state values. It is convenient, due to the equations for the above quantities, to filter instead sin $\alpha_{Hi}$ instead of $\alpha_{Hi}$ yielding $\overline{\sin \alpha_{Hi}}$ and from this to derive $\overline{\cos \alpha_{Hi}}$. The filtered value of the output, indicated as $\overline{\sin \alpha_{Hi}}$, is coupled to one input of a summation device 280, to another input of which is coupled a positive unity reference signal supplied at terminal 279 by a suitable conventional source (not shown). Polarizations are as shown in the drawing. From the value $\overline{\sin \alpha_{Hi}}$, the companion value $\overline{\cos \alpha_{Hi}}$ is derived by operating on the sine term by squaring it in a conventional multiplier 281 and by subtracting the squared term from a positive unity reference signal found on terminal 282 in accord with the polarities indicated for summation device 283. The square root of the difference is then extracted by function generator 284, yielding $\overline{\cos \alpha_{Hi}}$. The latter signal is applied, in the indicated polarity, to summation device 286 along with a positive unity reference signal found on terminal 285.

Next, the output of summation device 280 as the numerator and the $\overline{\cos \alpha_{Hi}}$ signal from function generator 284 on lead 288 as the denominator are coupled to a conventional amplitude divider 289. Function generator 290 then yields the logarithm to the base e of the quotient, which is a term representative of a function called, for convenience, $C_i$. In a generally similar way, the quantity $A_i$ is generated by supplying the output of summation device 286 and the term sin $\alpha_{Hi}$, in the indicated polarities, to the respective numerator and denominator inputs of divider 296, which, in turn, produces an electrical output value representing $A_i$. The value $A_i$ is subtracted twice from $C_i$ within summation device 291, polarities being as indicated in the drawing. The value $C_i - 2A_i$ is coupled to the denominator input of divider 299, while a signal representing $-w$ is coupled to its numerator input via terminal 298. It is understood that w, the weight in the water floating the vessel of a unit length of the anchor line, is a known value which may be set in as a fixed voltage from a conventional potentiometer (not shown) coupled to terminal 298. The output of divider 299, appearing at terminal 300, is the desired electrical signal representative of $N_{Li}$.

To generate $A_i$, the signal on lead 287 and the output of summation device 286 are coupled to respective denominator and numerator inputs of divider 296. The value representative of $A_i$ and the $C_i$ output of logarithmic generator 290 are supplied, in the polarities shown, to inputs of summation device 303, thus yielding an electrical signal corresponding to $C_i - A_i$. This signal is squared, being multiplied by itself in multiplier 308, and is then subtracted from a unity reference voltage found on terminal 309 within summation device 310. Polarities are as shown in the drawing. The difference output of device 310 is subjected to the action of square root circuit 311, and the output of the latter is coupled to the denominator input of divider 313. To a second input terminal 312 of divider 313 is coupled a positive unity reference signal, so that the output at terminal 314 of divider 313 is the desired term representing cos $\alpha_{oi}$. The term representing $C_i - A_i$ is multiplied by cos $\alpha_{oi}$ in multiplier 304 to yield the desired signal representing sin $\alpha_{oi}$ at terminal 307. It will readily be understood that the computations performed by the part of computer 93 shown in FIG. 9 may be represented by the Equations 9 through 15 of FIG. 16.

COMPUTER 110 FOR FAIRLEAD MOTION AS CALCULATED FROM TENSION CHANGE

Figure 10:
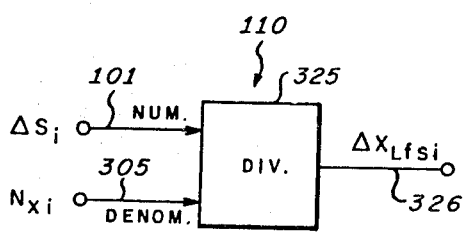
FIG. 10 is a detailed circuit diagram of computer 110 of FIG. 5a for fairlead motion as calculated from line tension.

The computer 110 for deriving a first version of the fairlead motion as calculated from anchor line tension change is shown in FIG. 10 and is one of the three cooperating entities 110, 112, and 117 involved with computing final fairlead motion values as seen in FIG. 5a. As in FIG. 10, computer 110, which is duplicated for each available anchor line, comprises simply a conventional divider 325. The electrical signal representing $\Delta S_i$ on lead 101 of FIG. 6 is supplied to the numerator input of divider 325, while the signal representative of $N_{Xi}$ on terminal 305 of FIG. 9 is supplied to the denominator input of divider 325. The output of the circuit on terminal 326 is a term representative of $\Delta X_{L/Si}$. In this computation, the change in anchor line axial tension ($\Delta S_i$) is divided by the sensitivity of tension changes to distance changes to provide an apparent change $\Delta X_{L/Si}$ in fairlead position. This change is called an apparent change because it is normally caused by several phenomena:

(a) translational motion of the vessel ($\Delta X_{Lfti}$),
(b) the taking in or letting out of the anchor line ($\Delta X_{L/Li}$), and
(c) attitude motion of the vessel $\Delta X_{Lfai}$ (pitch, roll, and heading).

Figure 11:
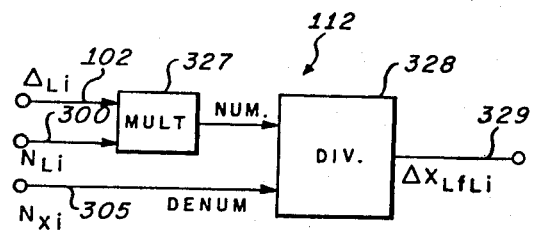
FIG. 11 is a detailed circuit of the computer 112 of FIG. 5a for fairlead motion as calculated from line length change.
Figure 12:
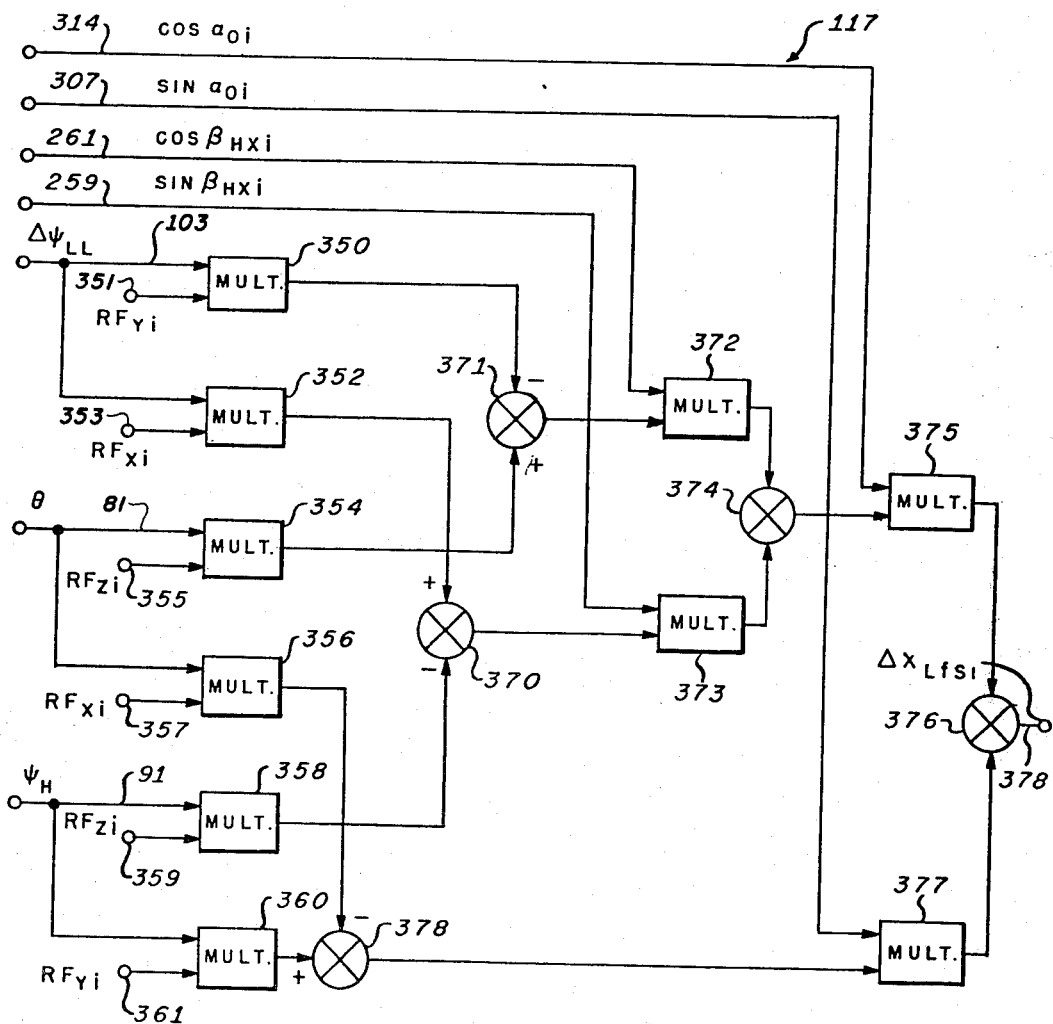
FIG. 12 is a detailed circuit diagram of the computer 117 of FIG. 5a for fairlead motion due to vessel attitude change.

The effects of sources b and c will be removed from the value of $\Delta X_{L/Si}$ by correction computed in the respective computers 111 and 117 of FIGS. 11 and 12. Note that the value $\Delta X_{L/Si}$ is actually the projection of the apparent anchor line motion onto the $X_{Li}$ direction (FIG. 8).

COMPUTER 112 FOR FAIRLEAD MOTION AS CALCULATED FROM LINE LENGTH CHANGE

The computer 112 for deriving fairlead motion as calculated from anchor line length change is shown in detail in FIG. 11. The device employs as inputs electrical signals representative of $\Delta L_i$ from lead 102 of FIG. 6, of $N_{Li}$ from terminal 300 of FIG. 9, and of $N_{Xi}$ from terminal 305 of FIG. 9. This device is repeated for each anchor line and yields a version of $\Delta X_{L/Li}$ on terminal 329. The $\Delta L_i$ and $N_{Li}$ terms are multiplied in multiplier 327 and the product is coupled to the numerator input of amplitude divider 328. To the other, or denominator, input of divider 328, a voltage proportional to $N_{Xi}$ is coupled, so that the output on terminal 329 of divider 328 is a desired version of $\Delta X_{L/Li}$ caused by the taking or letting out of the anchor line.

COMPUTER 117 FOR FAIRLEAD MOTION AS CALCULATED FROM VESSEL ATTITUDE CHANGE

Again supplied for each anchor line, the computer 117 of FIG. 12 calculates fairlead motion from vessel attitude change (pitch, roll, and yaw). Inputs to computer 117 are electrical voltages representative of terms generated in preceding figures. For example, the term $\cos \alpha_{oi}$ is derived from terminal 314 of FIG. 9, the term $\sin \alpha_{oi}$ from terminal 307 of FIG. 9, the term $\cos \beta_{HXi}$ from terminal 261 of FIG. 8, and the term $\sin \beta_{HXi}$ from terminal 259 of FIG. 8. Furthermore, a term representing $\Delta \psi_{LL}$ is derived from lead 103 of FIG. 7, a term representing $\theta$ is derived from lead 81 of FIG. 5a, and a term representing $\psi_H$ from lead 91 of FIG. 5a. Certain fixed reference voltages are also supplied, as will be further discussed. The projection of fairlead motion $\Delta X_{Lfai}$ on the $X_{Li}$ direction due to vessel attitude motion is calculated and appears as an output on terminal 378.

In computer 117, a signal representative of $\Delta \psi_{LL}$ on lead 103 is supplied to multiplier 350 along with a reference value $R_{FYi}$ supplied by a suitable source on terminal 351 by a suitable source (not shown). The value $R_{FYi}$, and the related values $R_{FXi}$ and $R_{FZi}$, yet to be discussed, locate each of the i fairleads with respect to a predetermined navigation reference point 20 on the vessel. In this, it is assumed that pitch, roll, and yaw motions of the vessel are relatively small. The $\Delta \psi_{LL}$ signal is also coupled to multiplier 352 to which the reference signal $R_{FXi}$ is coupled via terminal 353. The signal on lead 81 representative of angle $\theta$ and the reference voltage $R_{FZi}$ from terminal 355 are coupled to multiplier 354. The angle value $\theta$ and the reference voltage $R_{FXi}$ at terminal 357 are coupled to multiplier 356. The signal $\psi_H$ of lead 91 is coupled to first inputs of multipliers 358 and 360 which use the respective reference signals $R_{FZi}$ and $R_{FYi}$ on the associated terminals 359, 361. The $R_{FYi}$, $R_{FXi}$, and $R_{FZi}$ signals may be generated in any conventional manner; since they are fixed values they may be derived from potentiometers or in an otherwise conventional manner.

In further computing steps, the outputs of multipliers 350, 354 are coupled in the polarity shown to summation device 371, the outputs of multipliers 352, 358 are coupled in the polarity shown to summation device 370, and the outputs of multipliers 356, 360 are coupled in the polarity shown to summation device 378. The signal representative of $\cos \beta_{HXi}$ from terminal 261 is multiplied in multiplier 372 by the output of summation device 371. Likewise, the signal on terminal 259 representative of $\sin \beta_{HXi}$ and the output of summation device 370 are multiplied in multiplier 373. The signal representative of $\cos \alpha_{oi}$ from terminal 314 is multiplied by the output of summation device 374 within multiplier 375. The signal representative of $\sin \alpha_{oi}$ on terminal 307 is multiplied in multiplier 377 by the output of summation device 378. The outputs of multipliers 375 and 377 are combined by the summation device 376 in the indicated polarities to yield the desired third version of $\Delta X_{Lfai}$ on terminal 378. This computation is, of course, made for each anchor line.

As previously described with respect to FIG. 5a, the three versions of $\Delta X$ on the three respective conductors 111, 113, 116 of FIG. 5a are combined algebraically in summation device 114. The combination step is such that the outputs of computers 112 and 117 are both subtracted from the output of computer 110 so as to yield a truly compensated value of $\Delta X_{Lfti}$ on output lead 115 devoid of effects due to anchor line length changes and vessel altitude changes for use in the computer 130 of FIG. 5b. As previously noted, $\Delta X_{Lfti}$ is the component along the $X_{Li}$ direction of the vessel's actual translation motion.

COMPUTER 130 FOR LEAST SQUARES COMBINATION OF FAIRLEAD MOTION CHANGES

Figure 13A:
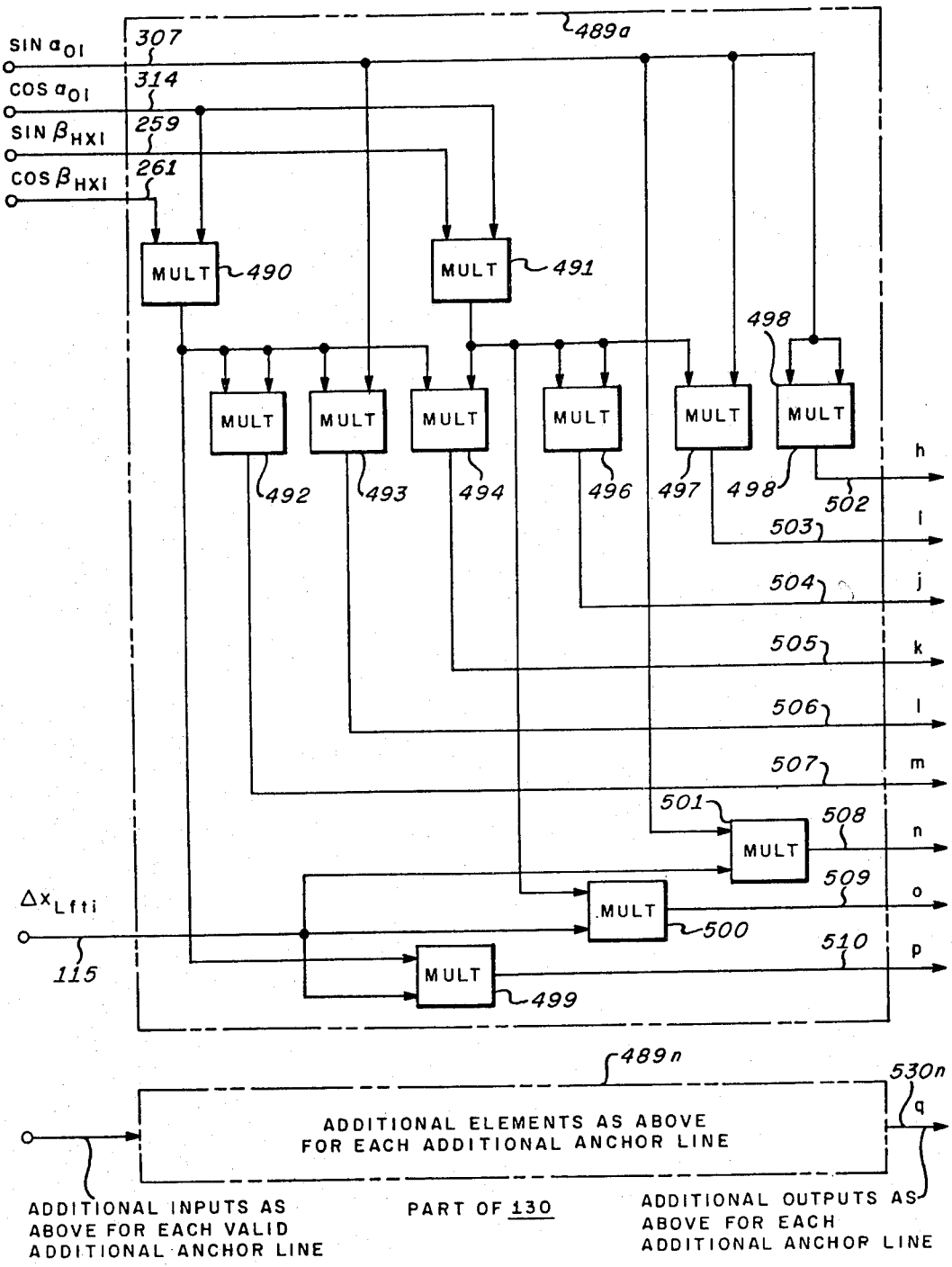
FIGS. 13a, 13b, and 14 provide a detailed circuit diagram of the computer 130 of FIG. 5b for least squares combination of fairlead motion changes.
Figure 13B:
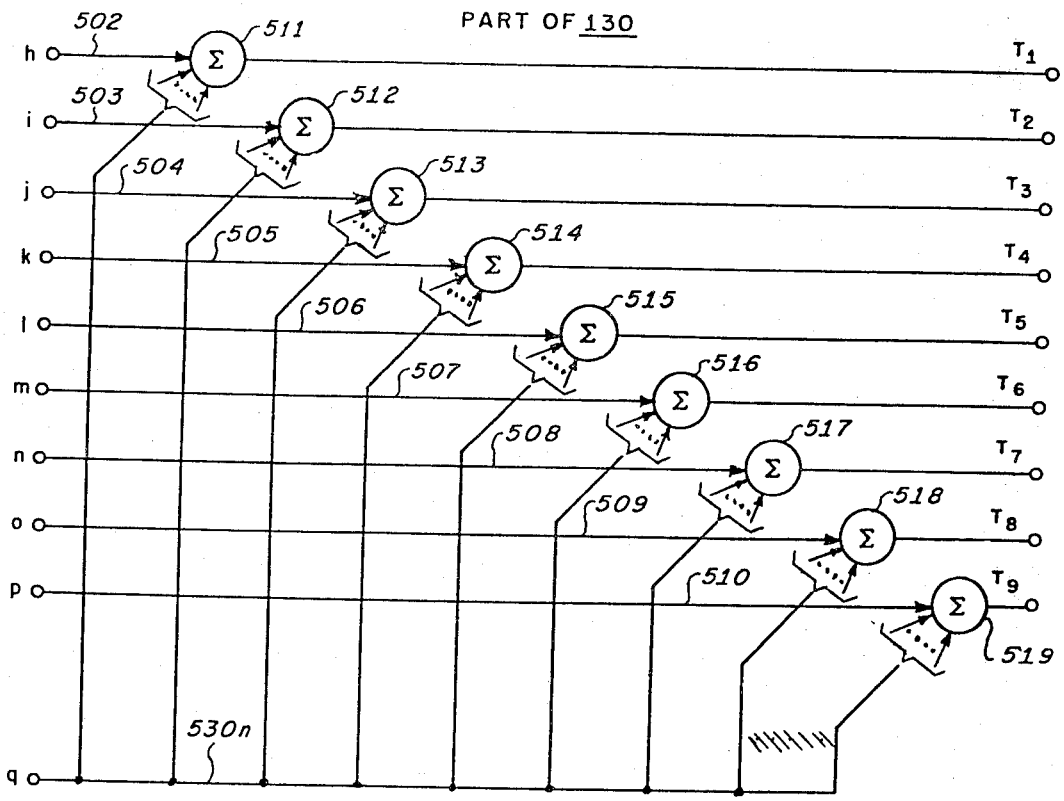
Figure 14:
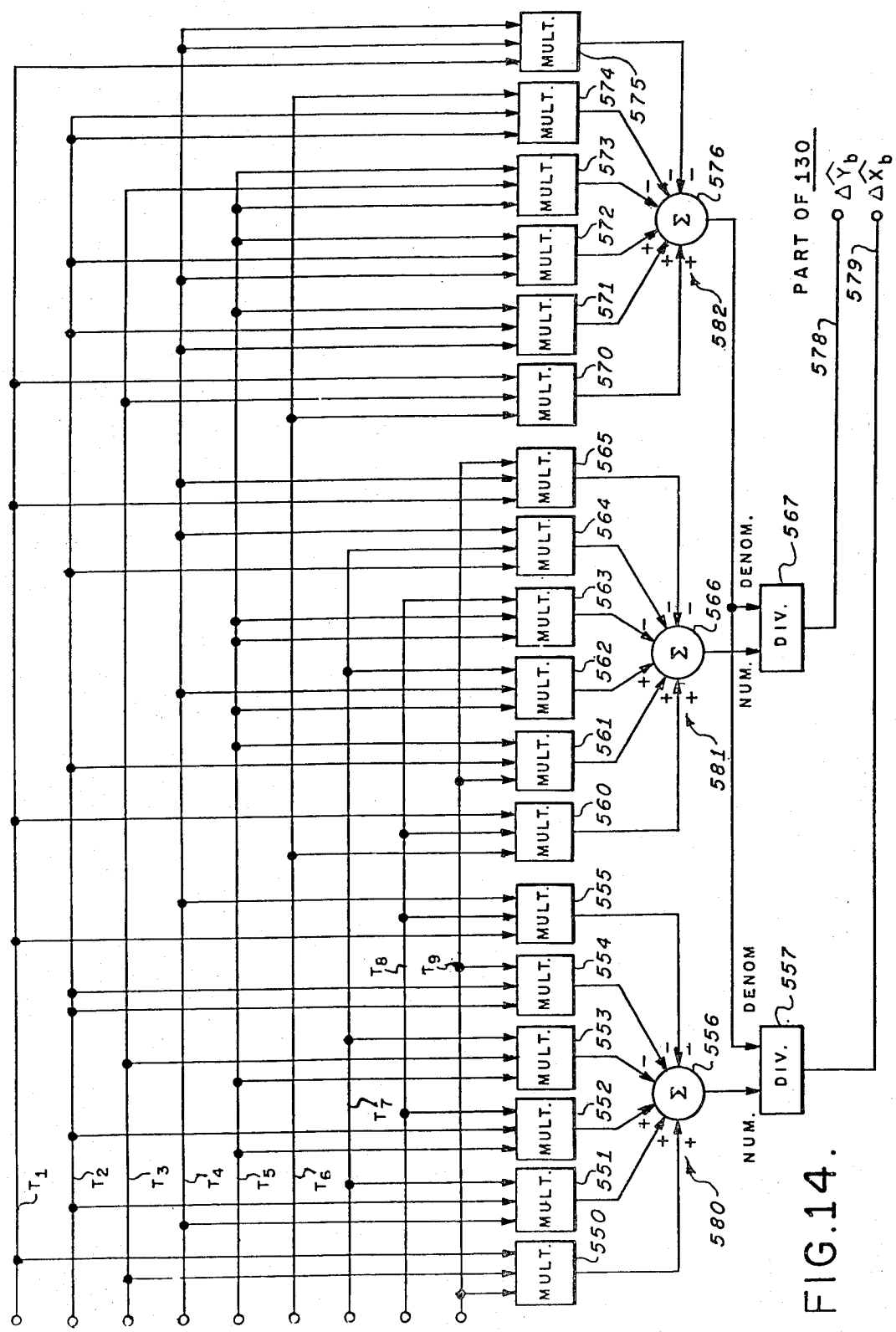
Figure 18:
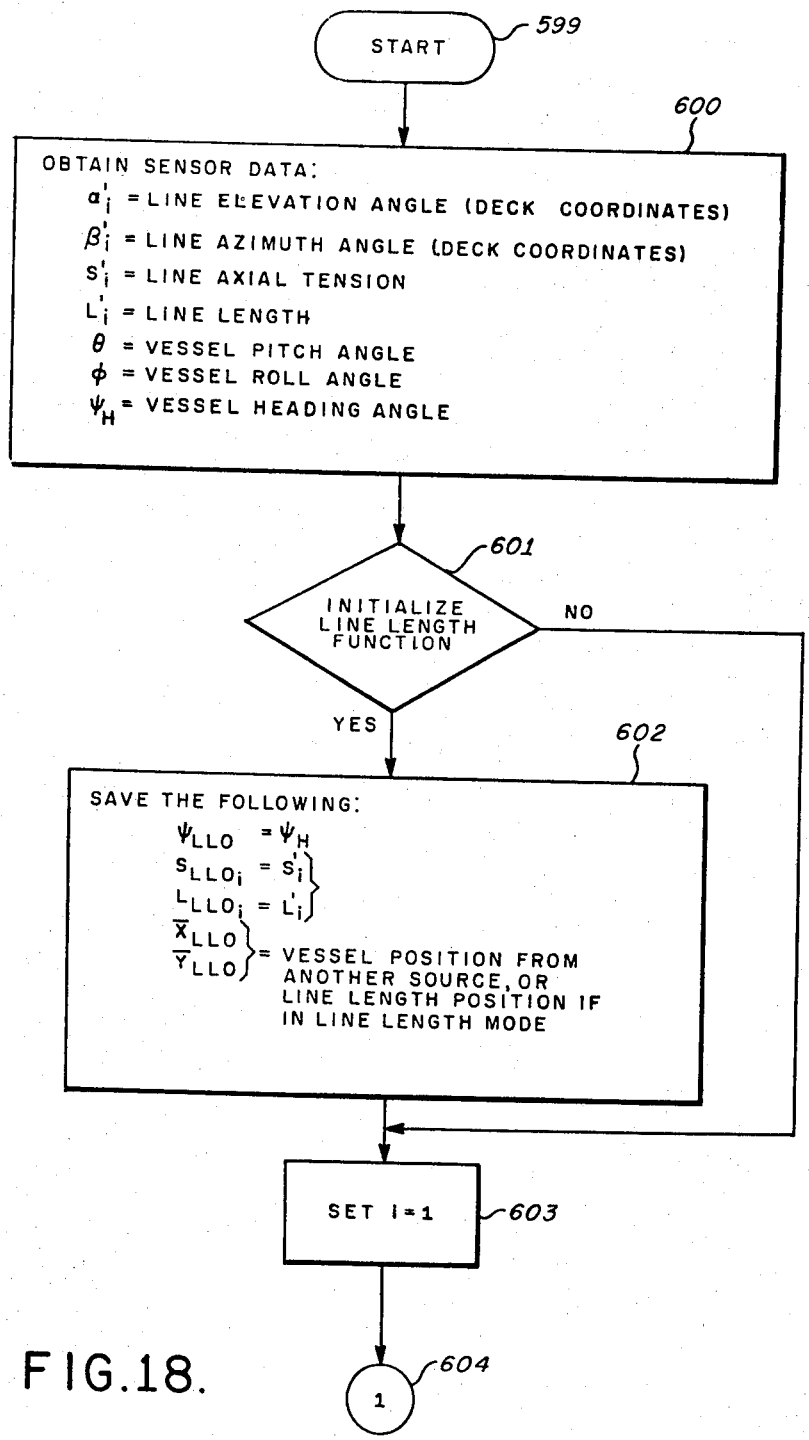
FIGS. 18 through 22 illustrate a program flow chart useful in practicing the computing steps of the invention in whole or in part with the aid of a universal digital computer.

FIGS. 13a, 13b, and 14 present details of the computer 130 of FIG. 5b whose purpose is to compute the least squares estimate of fairlead motion changes. The summation device 114 has served to combine the outputs of the computers of FIGS. 10, 11, and 12 according to Equation 17 of FIG. 17 to produce the component of fairlead translational motion along the $X_{Li}$ direction for each available anchor line. The fairlead translational motion change, however, is due to the vessel's translation motion change with respect to the initial coordinate system. Evidently the vertical term $\Delta \hat{Z}_b$ is not of interest in the present problem; it therefore does not eed to be calculated.

The quantity $\Delta X_{Lfti}$ can be written in terms of the X, Y, and Z components of vessel translational motion change and the two first of these latter values can be found using only three of the anchor lines. However, there are readily available more than three anchor lines, so that data from more than three of the lines can be combined in such a manner as to reduce the measurement error that would characterize data from only three anchor lines. The chosen method practiced by the apparatus of FIGS. 13a, 13b and 14 is to minimize the square of the error (the least squares approach). The best estimate of vessel translational motion change in the horizontal plane is called $\Delta \hat{X}_b$, $\Delta \hat{Y}_b$.

The device of FIG. 13a uses as inputs electrical signals representative of $\sin \alpha_{oi}$ from terminal 307 of FIG. 9, of $\cos \alpha_{oi}$ from terminal 314 of FIG. 9, of $\sin \beta_{HXi}$ from terminal 259 of FIG. 8, and $\cos \beta_{HXi}$ of terminal 261 of FIG. 8. In addition, the compensated $\Delta X_{Lfti}$ value on lead 115 of FIG. 5b is employed. These five signals are applied to as many of the computing elements 489 as there are anchor lines (up to 489 n).

Looking at the typical element 489a, it includes a multiplier 490 receiving, as inputs, signals representative of $\cos \alpha_{oi}$ and $\cos \beta_{HXi}$. A companion multiplier 491 receives $\cos \alpha_{oi}$ and $\sin \beta_{HXi}$ signals as inputs. The output of multiplier 490 is squared in multiplier 492. Multiplier 493 receives the output of multiplier 490 as one input and a signal representative of $\sin \alpha_{oi}$ as the other. Multiplier 494 receives the outputs of multipliers 490 and 491. Multiplier 496 serves to square the output of multiplier 491. Multiplier 497 multiplies the output of multiplier 491 by a signal representative of $\sin \alpha_{oi}$. Multiplier 498 squares the term representative of $\sin \alpha_{oil}$. The respective output signals are coupled into the apparatus of FIG. 13b via leads 502 through 507. In FIG. 13a, the signal representative of $\Delta X_{Lfti}$ is supplied to each of multipliers 499, 500, and 501. The second input to multiplier 499 is the output of multiplier 490, the second input of multiplier 500 is the output of multiplier 491, and the second input of multiplier 501 is the signal representative of $\sin \alpha_{oil}$. Corresponding outputs of multipliers 499, 500, 501 appear on the respective output leads 510, 509, and 508 for use in the apparatus of FIG. 13a.

In this manner, nine outputs on leads 502 through 510 of computer element 489a are respectively coupled to a series of multiple-input summing devices 511 through 519 (FIG. 13b). Nine corresponding outputs on nine further output leads for each of the computer elements 489n are similarly respectively coupled, as indicated by the multi-conductor 530n, into multiple input summation devices 511 through 519. In this manner, nine complex sum signals $T_1$ through $T_9$ are made available for use in the apparatus of FIG. 14. The terms $T_1$ through $T_9$ are temporary variables used in the least-squares estimation process and correspond to the summation terms in the matrices shown in FIG. 22 and in Equations (18), (19), and (20) of FIG. 17 where their actual values may be obtained by simple inspection.

The third portion of computer 130 is found in FIG. 14, which includes three complex cooperating sampling, multiplying, and summing matrices 580, 581, 582. Matrix 580 serves to yield a numerator input to divider 557, and matrix 581 similarly yields a numerator input to divider 567. The third matrix 582 serves the individual function of supplying denominator inputs to both of the dividers 557, 567. The latter generate the desired outputs $\Delta \hat{Y}_b$ and $\Delta \hat{X}_b$ on the respective terminals 578, 579.

With respect to matrix 580, the $T_9$, $T_3$, and $T_1$ signals from the FIG. 13b apparatus are multiplied together by multiplier 550. Signals $T_4$, $T_2$, and $T_7$ are the three inputs to multiplier 551 and are similarly multiplied together ($T_4 \cdot T_2 \cdot T_7$). Multiplier 552 forms the product $T_5 \cdot T_2 \cdot T_8$. Multiplier 553 forms the product $T_5 \cdot T_3 \cdot T_7$. Multiplier 554 squares $T_2$ and forms the product $T_2^2 \cdot T_9$. Multiplier 555 forms $T_1 \cdot T_8 \cdot T_4$. These six respective products are coupled to multiple input summing device 556 in the polarities indicated in the drawing and are coupled after summation to the numerator input of divider 557.

In a generally similar manner, the operation of matrix 581 includes the formation of a three-component product $T_6 \cdot T_8 \cdot T_1$ by multiplier 560. Multiplier 561 produces the product $T_9 \cdot T_2 \cdot T_5$, multiplier 562 forms $T_5 \cdot T_4 \cdot T_7$, multiplier 563 forms $T_5^2 \cdot T_8$, multiplier 564 forms $T_2 \cdot T_7 \cdot T_6$, and multiplier 565 forms $T_1 \cdot T_4 \cdot T_9$. These six respective products are inputs to the multiple input summing device 566 in the polarities indicated in the drawing and are coupled after summation to the numerator input of divider 567.

In matrix 582, multiplier 570 forms the product $T_6 \cdot T_3 \cdot T_1$. Likewise, multiplier 571 forms the product $T_4 \cdot T_2 \cdot T_5$, multiplier 572 also forms the product $T_4 \cdot T_2 \cdot T_5$, and multiplier 573 forms the product $T_5^2 \cdot T_3$. Multiplier 574 forms $T_2^2 \cdot T_6$ and multiplier 575 forms $T_1 \cdot T_4^2$. The six respective outputs of the multipliers are coupled to summation device 576 in the indicated polarities forming a signal supplied to both of the denominator inputs of both dividers 557, 567. Thus, the respective desired output signals $\Delta \hat{Y}_b$ and $\Delta \hat{X}_b$ are supplied at terminals 578, 579.

Any number of anchor lines may be used from three up to the maximum available (twelve in FIG. 2). The more used, the smaller the expected error. At least four anchor lines are considered to be necessary in practice, since, in general, there will be at least one anchor line in use at each corner of the vessel. The equations solved by the computer 130 of FIGS. 13a, 13b, 14 are indicated as Equations 18, 19 and 20 in FIG. 17. All sums in the equations include the terms for all available anchor lines.

THE VESSEL POSITION COMPUTER 133

Figure 15:
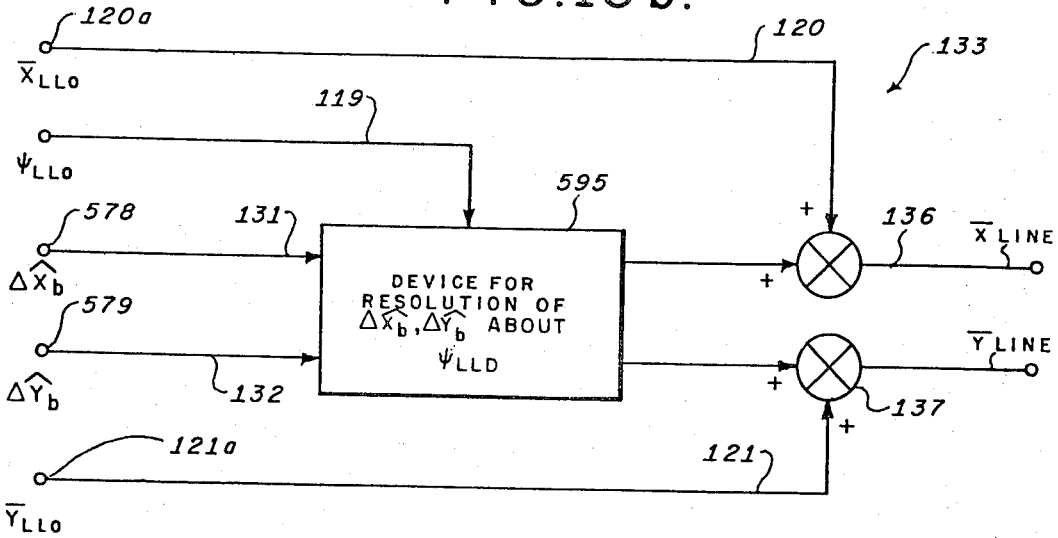
FIG. 15 is a detailed circuit diagram of the vessel position computer 133 of FIG. 5b.

Signals $\Delta \hat{X}_b$ and $\Delta \hat{Y}_b$ appearing on the respective leads 131, 132 are inputs to the vessel position computer 133, along with signals representative of $\psi_{LLo}$ on lead 119, of $\overline{X}_{LLo}$ on lead 120, and of $\overline{Y}_{LLo}$ on lead 121, all found in FIGS. 5a and 15. As indicated, the term representing $\psi_{LLo}$ is generated by initial value device 106 of FIG. 6. The values $\overline{X}_{LLo}$ and $\overline{Y}_{LLo}$ represent initial values of vessel position, normally obtained by conventional hyperbolic radio or satellite navigation and position determination radio aids in a conventional manner.

Within device 133, the best estimates of vessel position changes $\Delta \overline{X}_b$ and $\Delta \overline{Y}_b$ are resolved with respect to the heading of the initial coordinate system $\psi_{LLo}$ by resolver 595, obtaining the vessel position change as measured in the navigation coordinate system. The initial values $\overline{X}_{LLo}$ and $\overline{Y}_{LLo}$ are then respectively added to the corrected position change in summation devices 136, 137 to obtain the respective line length derived vessel position $\overline{X}_{LINE}$, $\overline{Y}_{LINE}$ on output leads 136, 137. The computation is an instrumentation of Equation 21 of FIG. 17.

The values $\overline{X}_{LINE}$ and $\overline{Y}_{LINE}$ on leads 136, 137 may be coupled to X and Y position read-out meters as proportional direct currents. These outputs may be read by operators trained to operate in a known manner an existing control system shown in FIG. 5b represented by a plurality 141 of manual winch controllers 145 and a plurality 142 of manual thruster motor controllers 146 via the respective leads 143, 144. There is one winch 145 and controller 141 for each anchor line and one thruster for each of the four corners of the ship. Thruster horizontal angle with respect to the vessel and actual thrust are controlled. Automatic controllers such as indicated at 138 also exist which serve to convert the signals on leads 136, 137 into winch and thruster commands on the respective leads 139, 140 for the direct control of the respective winches 145 and thrusters 146.

GENERAL COMMENTS AND SUMMARY

From FIGS. 1 through 15 and Equations 1 through 21, it is seen that the problem associated with pipe laying solved by the novel line length navigation system of the present invention is solved by the manipulation of a number of parameters derived from sensors normally aboard a conventional pipe laying or other vessel or readily made available by the addition of simple and readily obtainable sensors cooperating with active winches applying tension to the several anchor lines. For example, the vessel's pitch, roll, and heading angles are readily supplied from conventional marine gyrocompass and vertical gyroscopic instruments often already aboard the ship. The anchor line elevation and azimuth angles with respect to deck coordinates are yielded by conventional angle pick offs associated with the fairlead devices, as are the line axial tension and the length of anchor line paid out. Initial conditions, including the initial position of the vessel, are easily obtained in the usual manner. From certain of these parameters, the invention derives intermediate anchor line parameters for use in computing fairlead motion. A computer for calculating changes from initial values is aided by another computer which stores initial values. These changes use winch sensor and gyrocompass data for computing additional intermediate data.

All intermediate data is used to compute compensated fairlead motion data by first computing apparent fairlead motion from anchor line tension changes. This version of fairlead motion contains undesired terms due to apparent fairlead motion caused by anchor line length changes and also due to actual fairlead motion caused by vessel attitude changes. Therefore, second and third computations are made of the contributions of the latter effects. This is done so that apparent fairlead motion due to anchor line length change and actual fairlead motion due to vessel attitude change may be subtracted from the measure of apparent fairlead motion as calculated from anchor line tension change, yielding the desired compensated fairlead motion value free of significant disturbing components. An estimated value of vessel position change is then obtained by means of a least squares estimation involving these fairlead motion terms. Correction of vessel position then follows by cooperative operation of the winch and thruster assemblies.

It is evident by inspection of the foregoing analysis that the solution of the equations, such as Equations 1 through 21, may be accomplished by any of several known methods, including the use of a cooperative assembly of known analog or digital data processing or computing circuits or hybrid combinations thereof. For example, the several equations involve simple arithmetic operations such as addition, subtraction, multiplication, division, squaring, square rooting, and the generation of various trigonometric functions.

Many examples of both analog, digital, and hybrid computation elements are available in the prior art for accomplishing such computer operations and it is well known that they may readily be coupled together in cooperative relation for attaining desired results. It is furthermore evident that a conventional general purpose digital or analog computer may be employed for the purpose. It is well within the skill of computer programmers to process the equations discussed above, to create flow charts, and to translate the latter into computer routines and sub-routines for solution of such equations along with a compatible computer language for processing input data and instructions to produce outputs directly useful for application, for example, in a standard display or controller. It will, of course, be understood that these will be supplied in the conventional manner analog-to-digital and digital-to-analog converters as input and output interface elements where required.

An example of a program flow chart which may be used with a universal digital computer in providing one further embodiment of the invention is that illustrated in FIGS. 18 through 22. The activation by the operator, for example, of function block 599 of FIG. 18 causes a general purpose computer which may perform the operations of elements 93 through 137 of FIGS. 5a and 5b and of Equations 1 through 21 of FIGS. 16 and 17 successively to collect and to store the indicated seven types of sensor data for each of i fairlead sensor sets within the general purpose computer in the usual manner. The flow of the program through decision block 601 is routed according to whether or not initial values must be retained in storage. If not needed, the program flows directly to block 603, where i is set equal to 1. These and the indicated initialized values are then stored as in block 1 and the program moves through point 604.

Figure 19:
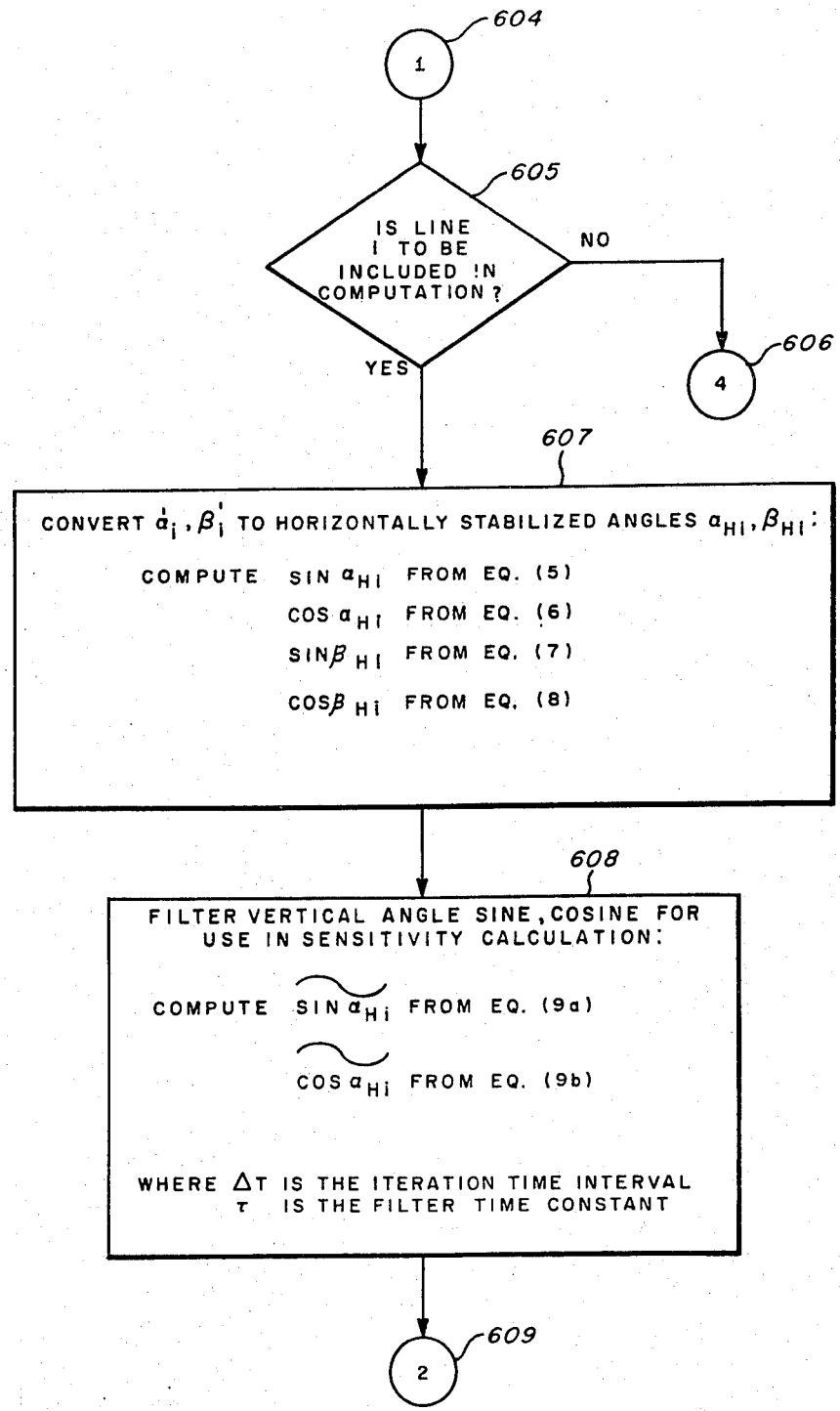

From point 604, the program flow is next into through the decision block 605 of FIG. 19; the answer to the question in block 605 is made in the conventional manner and is based upon data available to the operator on the basis of which he makes a judgment as to whether data from a particular line is to be used or skipped. The data from the total number of lines actually used is then the basis for the decision made in block 623 of FIG. 22. The program flow is next from block 605 into block 607, where the angles $\alpha_i'$ and $\beta_i'$ for the $i^{th}$ line are converted from ship's deck coordinates into the horizontally stabilized angles $\alpha_{Hi}$ and $\beta_{Hi}$. The next operation, dictated by logic block 608, is to generate the filtered values of the sine and cosine of $\alpha_{Hi}$, whereupon the program moves to point 609. The operations of blocks 607 and 608 take place, since not all anchor lines are necessarily used in any one computation, only when the $i^{th}$ anchor line is to be dealt with; when it is not, the program moves through point 606 and goes directly to point 606 in FIG. 22.

Figure 20:
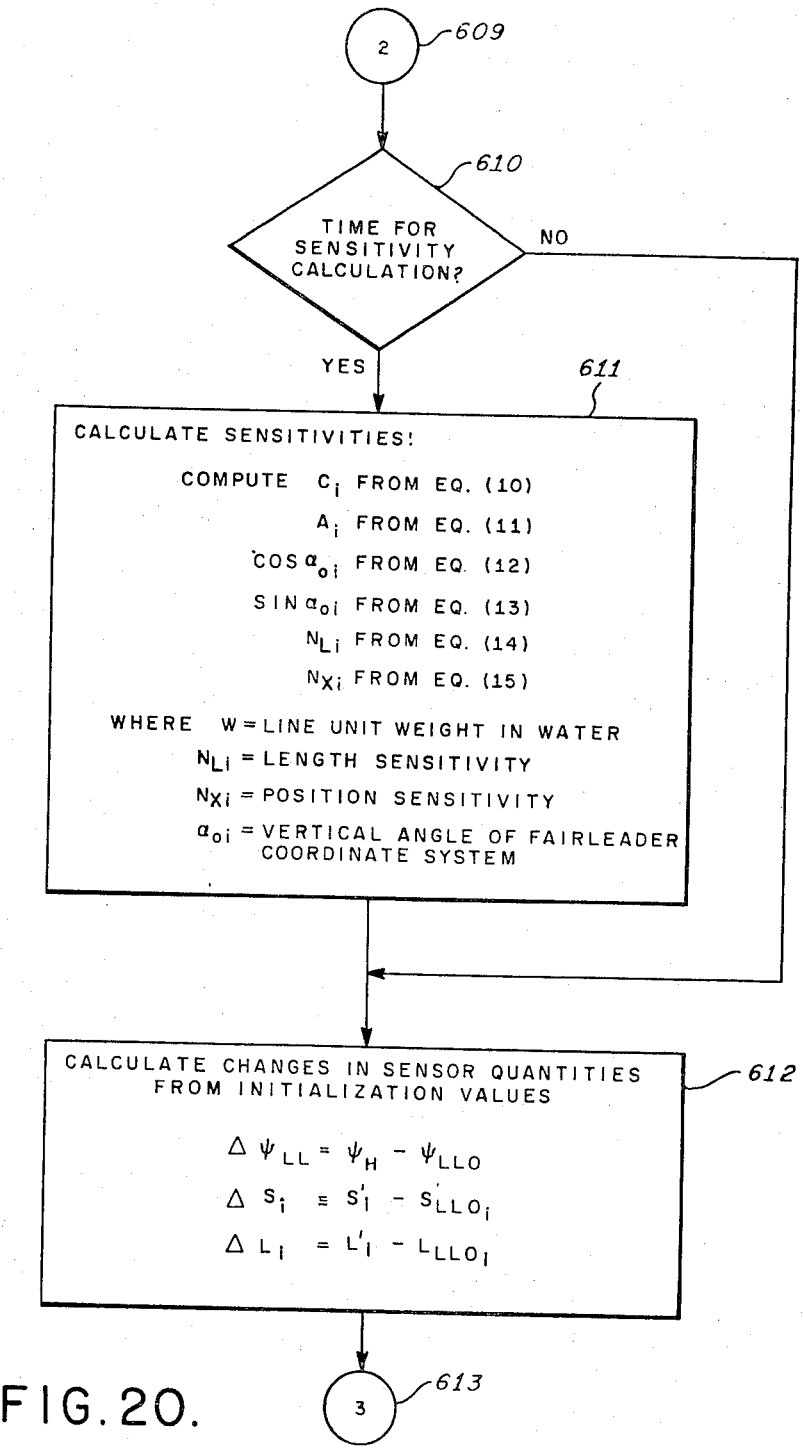

From point 609 in FIG. 20, the program flows into decision block 610, wherein the time for making a sensitivity calculation is determined for the $i^{th}$ line. If the decision is negative, the program flows directly to logic block 612; if the decision is positive, calculation of $C_i$, $A_i$, $\cos \alpha_{oi}$, $\sin \alpha_{Li}$, $N_{Li}$, and $N_{Xi}$ are now computed for the $i^{th}$ anchor line by virtue of block 611. In logic block 612, there is then computed the changes in the sensor outputs from initial measured values for the $i^{th}$ line so as to derive $\Delta \psi_{LL}$, $\Delta S_i$, and $\Delta L_i$. The program moves through point 613 and is supplied to FIG. 21.

Figure 21:
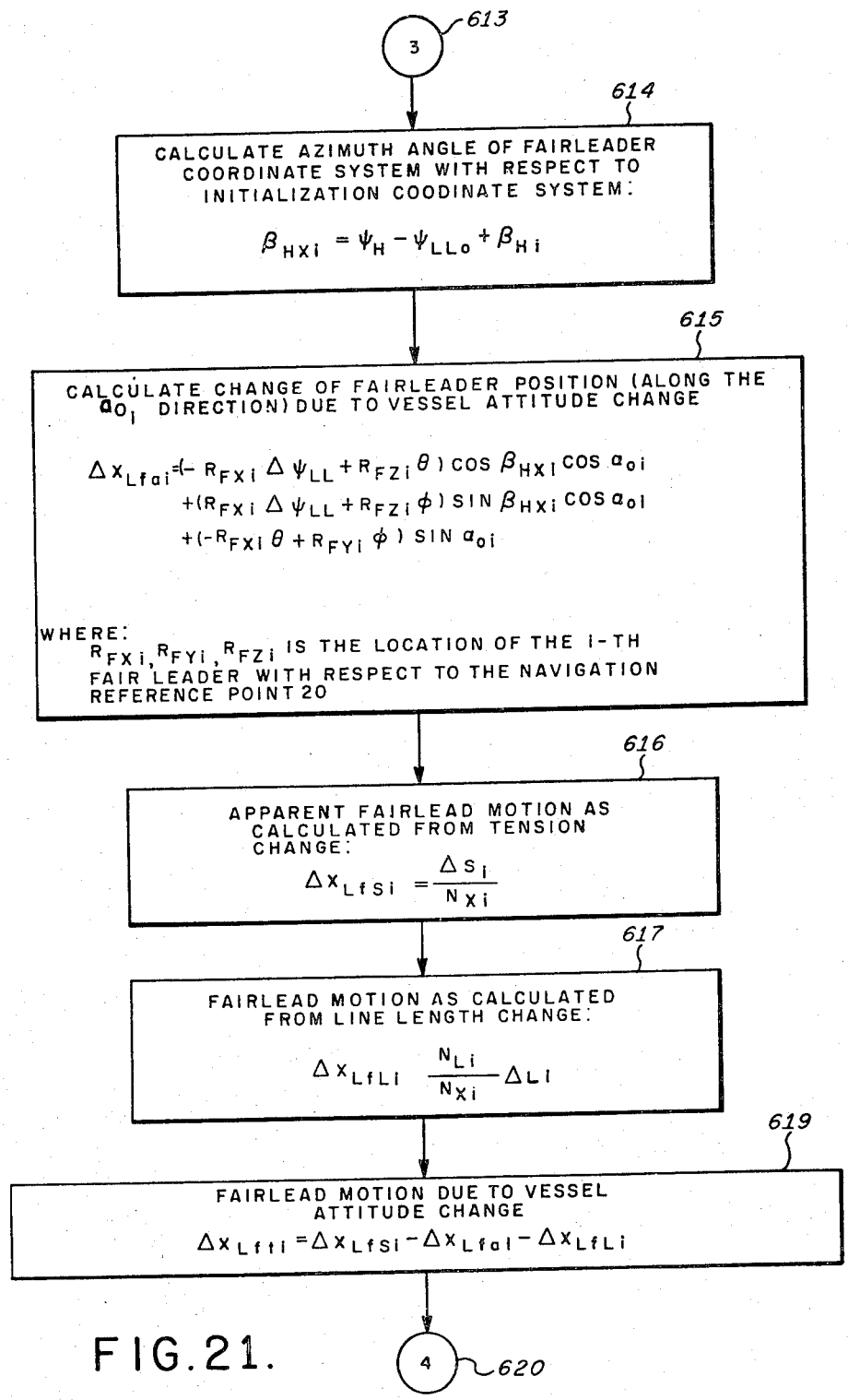

In FIG. 21, the program flow from point 613 is into block 614, whereby there is calculated the azimuth angle $\beta_{Xi}$ of the $i^{th}$ fairleader coordinate system with respect to the initial coordinate system, whereupon it is now possible to compute, in view of block 615, the change of fairlead position along the $\alpha_{oi}$ direction due to vessel attitude change. Blocks 616 and 617 then successively contribute measures of fairlead motion as calculated from anchor line tension changes and line length changes. The final block 619 represents the algebraic summation of the terms generated in blocks 615, 616, and 617 for producing the true $\Delta X_{Lfti}$ found at point 620.

Figure 22:
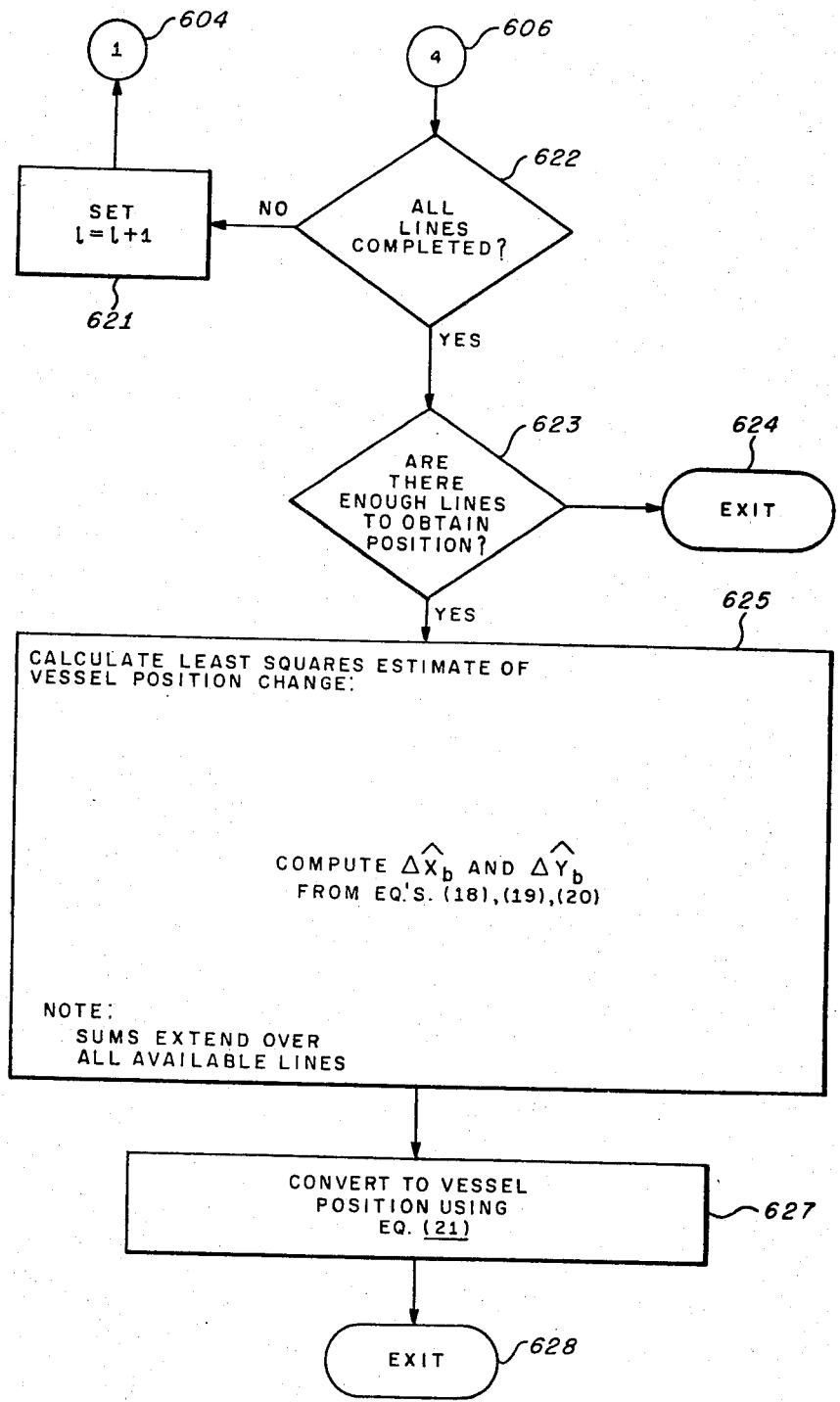

In FIG. 22, the decision block 622 determines if the predetermined number of fairlead sensor sets has been interrogated; if not, instructions are returned from block 621 to point 604 directing that the next or $(i+1)^{th}$ sensor set be examined. If all fairlead sets have been examined, the decision block 623 is exercised for determining if a sufficient number of fairlead sets have been interrogated that a useful answer can be generated. If not, operation of the program is ended at point 624; if yes, the logic block 625 is energized for calculating the least squares estimate of vessel position change, summations being made over all active anchor lines. Conversion of this data into vessel position, or the position of point 20 with respect to a shore based fiduciary mark, is then made by virtue of block 627 before the program exits at point 628.

While the invention has been described in its preferred embodiments, it is to be understood that the words which have been used are words of description rather than of limitation and that changes may be made without departing from the true scope and spirit of the invention in its broader aspects.

What is claimed is:

1. Vessel position determination means comprising:
   inertial reference means disposed on said vessel for supplying measures of vessel pitch, roll, and heading angles,
   fairlead means disposed on said vessel substantially at the corners of a rectangular pattern,
   anchor and anchor line means cooperatively associated with said fairlead means,
   said fairlead means each including sensor means for supplying:
      a first measure of the angle from the associated anchor line to a predetermined plane parallel to the vessel deck,
      a second measure of the angle from the associated anchor line to a predetermined fore-aft reference axis,
      a third measure of the total length paid out of the associated anchor line, and
      a fourth measure of the axial tension in the associated anchor line,
   system computer means at least responsive to said pitch, roll, and heading angles and to said first, second, third, and fourth measures for computing the best estimate of the vessel's horizontal position change, and
   resolver means responsive to said best estimate and to initial values of vessel heading and vessel position for generating further measures of said vessel actual position.

2. Apparatus as described in claim 1 wherein said system computer means includes:
   initial value means for storage on demand on initial values of said vessel heading angle and said third and fourth measures for each anchor line, and
   first computer means responsive at least to said vessel heading angle, to said third and fourth measures, and to said initial values thereof for computing respective fifth, sixth, seventh, and eighth respective measures of changes in axial tension and length playout out of each anchor line, of changes in vessel heading from the initial value thereof for each anchor line, and of the azimuth angle of each anchor line with respect to the vessel's initial heading.

3. Apparatus as described in claim 2 wherein said system computer means further includes second computer means responsive at least to said fifth measure for computing a ninth measure, derived from anchor line tension change, of components of anchor line motion for each associated anchor line.

4. Apparatus as described in claim 3 wherein said system computer means further includes third computer means responsive at least to said sixth measure for computing a tenth measure, derived from anchor line length change, of components of anchor line motion for each associated anchor line.

5. Apparatus as described in claim 4 wherein said system computer means further includes fourth computer means responsive at least to said seventh and eighth measures for computing an eleventh measure, derived from vessel attitude change, of components of anchor line motion for each associated anchor line.

6. Apparatus as described in claim 5 wherein said system computer means includes means for subtracting said tenth and eleventh measures from said ninth measure for generating a twelfth measure of actual translational anchor line motion for each associated anchor line.

7. Apparatus as described in claim 6 wherein said system computer means further includes fifth computer means directly responsive at least to said eighth and twelfth measures for computing the best estimate of the vessel's horizontal position change, said resolver means being directly responsive at least to said fifth computer means.

8. Apparatus as described in claim 7 wherein said system computer means further includes sixth computer means responsive to said vessel pitch and roll measures and to said first and second measures, whereby are generated thirteenth, fourteenth, fifteenth, sixteenth, seventeenth, and eighteenth respective measures of the sines and cosines of the vertical angles of each associated anchor line with respect to the horizontal, of the sines and cosines of the angles from each associated anchor line to the projection of the fore-aft axis of the vessel onto a predetermined horizontal plane, of the length sensitivity of each associated anchor line, and of the position sensitivity of each associated anchor line.

9. Apparatus as described in claim 8 wherein said first computer means is additionally responsive to said fifteenth and sixteenth measures.

10. Apparatus as described in claim 9 wherein said second computer means is additionally responsive to said eighteenth measure.

11. Apparatus as described in claim 10 wherein said third computer means is additionally responsive to said seventeenth and eighteenth measures.

12. Apparatus as described in claim 11 wherein said fourth computer means is additionally responsive to said measures of vessel pitch and roll and to said thirteenth, fourteenth, fifteenth, and sixteenth measures.

13. Apparatus as described in claim 12 wherein said fifth computer means is additionally responsive to said eighth, twelfth, thirteenth, fourteenth, fifteenth, and sixteenth measures.

14. Apparatus as described in claim 8 wherein said first computer means includes
first summation means responsive to said vessel heading and to the initial value thereof,
second summation means responsive to the length played out of a predetermined anchor line and to the initial value thereof,
third summation means responsive to the axial tension within a predetermined anchor line and to the initial value thereof,
inverse tangent generator means responsive to said fifteenth and sixteenth measures, and
fourth summation means responsive to said inverse tangent generator means and to said measure of vessel heading and to the initial value thereof.

15. Apparatus as described in claim 8 wherein said second computer means includes divider means wherein said fifth measure is applied as an input numerator and said eighteenth measure is applied as an input denominator for yielding said ninth measure.

16. Apparatus as described in claim 8 wherein said third computer means includes:
multiplier means responsive to said sixth and seventeenth measures for forming a product, and
divider means responsive to said product as a numerator and to said eighteenth measure as a denominator for yielding said tenth measure.

17. Apparatus as described in claim 8 wherein said fourth computer means includes:
means for subtracting a version of said seventh measure from a version of said measure of vessel pitch angle for forming a first output,
means for subtracting a version of said measure of vessel heading angle from a version of said seventh measure for forming a second output,
means for multiplying said first output by said sixteenth measure for forming a third output,
means for multiplying said fifteenth measure by said second output to form a fourth output,
means for adding said third and fourth outputs to form a fifth output, and
means for multiplying said fifth output by said fourteenth measure for forming a sixth output.

18. Apparatus as described in claim 17 wherein said fourth computer additionally includes:
means for subtracting a version of said measure of said vessel pitch angle from a version of said vessel heading angle for forming a seventh output,
means for multiplying said seventh output by said thirteenth measure for forming an eighth output, and
means for adding said sixth and eighth outputs for forming said fourth computer output.

19. Apparatus as described in claim 8 wherein said sixth computer means includes:
means for forming sine and cosine measures of said measures of vessel roll and pitch and of said first and second measures,
first multiplier array means responsive to first predetermined ones of said sine and cosine measures for forming first, second, and third trigonometric outputs, and
first subtractor means for subtracting said first trigonometric output from the sum of said second and third trigonometric outputs, whereby measures of the sine of the angle from each anchor line with respect to the vertical are generated.

20. Apparatus as described in claim 19 wherein said sixth computer means further includes:
second multiplier array means responsive to second predetermined ones of said sine and cosine measures for forming fourth and fifth trigonometric outputs, and
second subtractor means for subtracting said fourth from said fifth trigonometric measures, whereby a first numerator value is formed.

21. Apparatus as described in claim 20 wherein said sixth computer further includes:
third multiplier array means responsive to third predetermined ones of said sine and cosine measures for forming sixth, seventh, and eighth trigonometric outputs, and
summation means for adding said sixth, seventh, and eighth trigonometric outputs, whereby a second numerator value is formed.

22. Apparatus as described in claim 21 in which said sixth computer means further includes means responsive to said first subtractor means for generating measures of the cosine of the angle from each anchor line with respect to the vertical.

23. Apparatus as described in claim 22 in which said sixth computer means further includes first and second divider means, both having denominator input means responsive to said measures of the cosine of the angle from each anchor line with respect to the vertical and both having numerator input means respectively responsive to said first and second numerator values.

24. Apparatus as described in claim 19 wherein in said sixth computer means further includes:
filter means for filtering the output of said first subtractor means for forming first filtered versions of measures of the sine of the angle from each anchor line with respect to the vertical,
means for converting said first filtered versions into second filtered versions of the measures of the cosine of the angle from each anchor line with respect to the vertical,
first and second divider means respectively responsive by dividing said first filtered measure by said second filtered measure and said second filtered measure by said first filtered measure whereby first and second filtered quotient values are generated,
means for generating the logarithm of said first quotient value,
means for subtracting twice the second quotient value from the logarithm of said first quotient value for forming a first difference value, and
means for dividing a representation of the weight in the water floating the vessel of a unit length of said anchor line by said first difference value, whereby there is generated an output representative of each line length sensitivity.

25. Apparatus as described in claim 24 wherein said sixth computer additionally includes:
means for subtracting said second quotient value from the logarithm of said first quotient value for generating a second difference value, and
means for generating from said second difference value outputs representations of the cosine of the vertical angle of each anchor line coordinate system with respect to the horizon.

26. Apparatus as described in claim 25 wherein said sixth computer additionally includes means for multiplying said second difference value by said represenations of the cosines of the vertical angle of each anchor line coordinate system with respect to the horizon, whereby representations of the sines of said vertical angle are generated.

27. Apparatus as described in claim 8 wherein said fifth computer means further includes:
first multiplier matrix means for forming first predetermined products of said thirteenth, fourteenth, fifteenth, and sixteenth measures for each of said anchor lines,
second multiplier matrix means for forming predetermined products of selected ones of said first predetermined products and said actual translational anchor line motion for each anchor line, and
means for forming respective first and second multiplicities of summations of said first and second predetermined products for all anchor lines.

28. Apparatus as described in claim 27 wherein said fifth computer means further includes:
third, fourth, and fifth multiplier matrix means respectively responsive to predetermined ones of said first and second multiplicities of summations,
first summation means for algebraically summing the output of said third multiplier matrix means for forming a first summed numerator output,
second summation means for algebraically summing the output of said fourth multiplier matrix means for forming a second summed numerator output,
third summation means for algebraically summing the output of said fifth multiplier matrix means for forming a summed denominator output, and
means responsive to said numerator and denominator outputs for forming the best estimate of the vessel horzontal position change.

29. Apparatus as described in claim 28 wherein said means responsive to said numerator and denominator output comprises:
first divider means responsive to said first summed numerator output and to said summed denominator output for forming a first component of said best estimate of the vessel horizontal position change,
second divider means responsive to said second summed numerator output and to said summed denominator output for forming a second component of said best estimate of the vessel horizontal position normal to said first component.

30. A machine method of determining the position of a vessel having fairlead means disposed on said vessel substantially at corners of a rectangular pattern with anchor and anchor line means cooperatively associated with said fairlead means, said machine method including the steps of:
obtaining measures of said vessel pitch, roll, and azimuth angles,
obtaining first measures of the angles of at least four of said anchor lines with respect to a predetermined plane parallel to the vessel deck,
obtaining second measures of the angles of said four of said anchor lines with respect to a predetermined vessel foreaft reference axis,
obtaining third measures of the total lengths paid out of said anchor lines,
obtaining fourth measures of the axial tensions in said anchor lines,
employing said measures of vessel pitch, roll, and azimuth angles and said first, second, third, and fourth measures for computing the best estimate of the vessel's horizontal position change, and
employing resolver means responsive to said best estimate and initial values of vessel heading and position for computing further measures of said vessel actual position.

31. The machine method of claim 30 including the substeps of:
storage of initial values of said vessel heading angle and of said third and fourth measures for each anchor line, and
employing said vessel heading angle, said third and fourth measures and said initial values thereof for computing respective fifth, sixth, seventh, and eighth respective measures of changes in axial tension and length paid out of each anchor line, of changes in vessel heading from the initial value thereof for each anchor line, and of the vessel's initial heading.

32. The machine method of claim 31 including the substep of employing said fifth measure for computing a ninth measure, derived from anchor line tension change, of components of anchor line motion for each anchor line.

33. The machine method of claim 32 including the substep of employing said sixth measure for computing a tenth measure, derived from said anchor line length change, of components of anchor line motion for each anchor line.

34. The machine method of claim 33 including the substep of employing said seventh and eighth measures for computing an eleventh measure, derived from vessel attitude change, of components of anchor line motion for each anchor line.

35. The machine method of claim 34 including the substep of subtracting said tenth and eleventh measures from said ninth means for generating a twelfth means of actual translational anchor line motion for each anchor line.

36. The machine method of claim 35 including the substep of utilizing said eighth and twelfth measures for computing the best estimate of the vessel's horizontal position.

37. The machine method of claim 36 including the substep of utilizing said vessel pitch and roll measures and said first and second measures for generating thirteenth, fourteenth, fifteenth, sixteenth, seventeenth, and eighteenth respective measures of the sines and cosines of the vertical angles of each anchor line with respect to the horizontal, of the sines and cosines of the angles of each anchor line to the projection of the fore-aft axis of the vessel onto a predetermined horizontal plane, of the length sensitivity of each anchor line, and of the position sensitivity of each anchor line.

38. The machine method of claim 37 wherein the substep of computing said fifth, sixth, seventh, and eighth measures additionally utilizes said fifteenth and sixteenth measure.

39. The machine method of claim 38 wherein the substep of computing said ninth measure additionally utilizes said eighteenth measure.

40. The machine method of claim 39 wherein the substep of computing said tenth measure additionally utilizes said seventeenth and eighteenth measures.

41. The machine method of claim 40 wherein the substep of computing said eleventh measure additionally utilizes said thirteenth, fourteenth, fifteenth, and sixteenth measures.

42. The machine method of claim 41 wherein the substep of computing said twelfth measure additionally utilizes said eighth, twelfth, thirteenth, fourteenth, fifteenth, and sixteenth measures.

* * * * *